(12) United States Patent
Montemurro et al.

(10) Patent No.: US 11,240,655 B2
(45) Date of Patent: Feb. 1, 2022

(54) ADDRESS ASSIGNMENT FOR INITIAL AUTHENTICATION

(71) Applicant: BlackBerry Limited, Waterloo (CA)

(72) Inventors: Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 17/072,957

(22) Filed: Oct. 16, 2020

(65) Prior Publication Data

US 2021/0037374 A1 Feb. 4, 2021

Related U.S. Application Data

(63) Continuation of application No. 13/547,880, filed on Jul. 12, 2012, now Pat. No. 10,812,964.

(51) Int. Cl.
*H04W 8/08* (2009.01)
*H04W 36/14* (2009.01)

(52) U.S. Cl.
CPC ............ *H04W 8/087* (2013.01); *H04W 36/14* (2013.01)

(58) Field of Classification Search
CPC .............................. H04W 8/087; H04W 36/14
See application file for complete search history.

(56) References Cited

U.S. PATENT DOCUMENTS

| 6,283,143 | B1 | 9/2001 | Adachi, Jr. et al. |
| 6,493,561 | B1 | 12/2002 | Hasegawa |
| 7,010,305 | B2 | 3/2006 | Immonen et al. |
| 7,065,645 | B2 | 6/2006 | Teicher |
| 7,151,764 | B1 | 12/2006 | Heinonen et al. |
| 7,187,691 | B2 | 3/2007 | Gavette |
| 7,277,932 | B2 | 10/2007 | Adachi et al. |
| 7,376,097 | B2 | 5/2008 | Yegin |
| 7,606,209 | B2 | 10/2009 | Watanabe |
| 7,683,773 | B1 | 3/2010 | Goodall et al. |

(Continued)

FOREIGN PATENT DOCUMENTS

| CN | 1893396 A | 1/2007 |
| CN | 1969529 A | 5/2007 |

(Continued)

OTHER PUBLICATIONS

Office Action dated Feb. 12, 2021; U.S. Appl. No. 16/261,131, filed Jan. 29, 2019; 7 pages.

(Continued)

*Primary Examiner* — Brian P Cox
(74) *Attorney, Agent, or Firm* — Conley Rose, P. C.; J. Robert Brown, Jr.; Gayatry S. Nair

(57) ABSTRACT

A mobile device may transition between Extended Service Set ("ESS") networks while maintaining the same internet protocol ("IP") address while transitioning. The transition may occur seamlessly, such that a consumer never loses the network connection despite transitioning between networks. The mobile device may receive an IP address from a pool of addresses, such that the mobile device can keep that IP address as it is transitions between networks that each have access to the pool. The assignment of the IP address to the mobile device is from the pool of IP addresses rather than from the AP.

20 Claims, 7 Drawing Sheets

(56) References Cited

U.S. PATENT DOCUMENTS

| | | |
|---|---|---|
| 7,684,333 B1 | 3/2010 | Dasylva et al. |
| 8,170,481 B2 | 5/2012 | Rangarajan et al. |
| 8,274,908 B2 | 9/2012 | Hsin et al. |
| 8,374,122 B2 | 2/2013 | Meier et al. |
| 8,411,640 B2 | 4/2013 | Kuroda |
| 8,442,024 B2 | 5/2013 | Montemurro et al. |
| 8,458,279 B2 | 6/2013 | Montemurro et al. |
| 8,463,175 B2 | 6/2013 | Bajko |
| 8,514,807 B2 | 8/2013 | Kim et al. |
| 8,594,064 B2 | 11/2013 | Kaushik et al. |
| 8,605,673 B2 | 12/2013 | Xiao et al. |
| 8,626,073 B2 | 1/2014 | Ruuska |
| 8,681,769 B2 | 3/2014 | Montemurro et al. |
| 8,750,180 B2 | 6/2014 | McCann et al. |
| 8,775,533 B2 | 7/2014 | Hassan et al. |
| 8,792,489 B2 | 7/2014 | Anantharam et al. |
| 8,868,071 B2 | 10/2014 | Ha et al. |
| 8,879,455 B1 | 11/2014 | Stephenson et al. |
| 8,897,788 B2 | 11/2014 | Ruuska |
| 8,929,346 B2 | 1/2015 | Montemurro et al. |
| 8,942,221 B2 | 1/2015 | McCann et al. |
| 9,137,621 B2 | 9/2015 | McCann et al. |
| 9,204,299 B2 | 12/2015 | McCann et al. |
| 9,301,127 B2 | 3/2016 | McCann et al. |
| 9,615,383 B2 | 4/2017 | Montemurro et al. |
| 9,622,155 B2 | 4/2017 | McCann et al. |
| 9,794,967 B2 | 10/2017 | McCann et al. |
| 9,820,199 B2 | 11/2017 | McCann et al. |
| 9,942,316 B2 | 4/2018 | McCann et al. |
| 10,142,921 B2 | 11/2018 | McCann et al. |
| 10,200,941 B2 | 2/2019 | McCann et al. |
| 10,349,321 B2 | 7/2019 | McCann et al. |
| 10,356,662 B2 | 7/2019 | Montemurro et al. |
| 10,470,106 B2 | 11/2019 | Bajko et al. |
| 10,736,020 B2 | 8/2020 | McCann et al. |
| 2002/0086675 A1 | 7/2002 | Mansour |
| 2002/0141369 A1 | 10/2002 | Perras |
| 2002/0159418 A1 | 10/2002 | Rudnick et al. |
| 2002/0169883 A1 | 11/2002 | Bright et al. |
| 2003/0103521 A1 | 6/2003 | Raphaeli et al. |
| 2003/0117984 A1 | 6/2003 | Gavette |
| 2003/0134636 A1 | 7/2003 | Sundar et al. |
| 2003/0217168 A1 | 11/2003 | Adachi et al. |
| 2004/0014422 A1 | 1/2004 | Kallio |
| 2004/0090958 A1 | 5/2004 | Park et al. |
| 2004/0199661 A1 | 10/2004 | Murdock |
| 2005/0060319 A1 | 3/2005 | Douglas |
| 2005/0090259 A1 | 4/2005 | Jain et al. |
| 2005/0097362 A1 | 5/2005 | Winget et al. |
| 2005/0111419 A1 | 5/2005 | Kwon et al. |
| 2005/0210523 A1 | 9/2005 | Parnell et al. |
| 2005/0286456 A1 | 12/2005 | McNew et al. |
| 2006/0067526 A1 | 3/2006 | Faccin et al. |
| 2006/0109113 A1 | 5/2006 | Reyes et al. |
| 2006/0114928 A1 | 6/2006 | Utsunomiya et al. |
| 2006/0142034 A1 | 6/2006 | Wentink et al. |
| 2006/0153230 A1 | 7/2006 | Miyata et al. |
| 2006/0221901 A1 | 10/2006 | Yaqub et al. |
| 2006/0245373 A1 | 11/2006 | Bajic |
| 2006/0264245 A1 | 11/2006 | Luo |
| 2007/0025297 A1 | 2/2007 | Lee et al. |
| 2007/0041344 A1 | 2/2007 | Yaqub et al. |
| 2007/0064655 A1 | 3/2007 | Ruuska |
| 2007/0064660 A1 | 3/2007 | Qi et al. |
| 2007/0086359 A1 | 4/2007 | Yaqub |
| 2007/0110018 A1 | 5/2007 | Delaney et al. |
| 2007/0110092 A1 | 5/2007 | Kangude et al. |
| 2007/0124592 A1 | 5/2007 | Oyama |
| 2007/0153732 A1 | 7/2007 | Yao |
| 2007/0230389 A1 | 10/2007 | Amann et al. |
| 2007/0230423 A1 | 10/2007 | Yoshida et al. |
| 2007/0243888 A1 | 10/2007 | Faccin |
| 2007/0297438 A1 | 12/2007 | Meylan et al. |
| 2008/0031212 A1 | 2/2008 | Ogura |
| 2008/0049761 A1 | 2/2008 | Lin et al. |
| 2008/0057992 A1 | 3/2008 | Griffin |
| 2008/0095048 A1 | 4/2008 | Zhong |
| 2008/0096580 A1 | 4/2008 | Montemurro |
| 2008/0114857 A1 | 5/2008 | Snider |
| 2008/0123607 A1 | 5/2008 | Jokela |
| 2008/0141031 A1 | 6/2008 | Oba et al. |
| 2008/0151796 A1 | 6/2008 | Jokela |
| 2008/0178277 A1 | 7/2008 | Oba et al. |
| 2008/0186962 A1 | 8/2008 | Sinha |
| 2008/0261574 A1 | 10/2008 | Rinta-Aho et al. |
| 2008/0270534 A1 | 10/2008 | Xia et al. |
| 2008/0298333 A1 | 12/2008 | Seok |
| 2009/0010399 A1 | 1/2009 | Kim et al. |
| 2009/0031138 A1 | 1/2009 | Nakhjir |
| 2009/0046657 A1 | 2/2009 | Kim et al. |
| 2009/0047922 A1 | 2/2009 | Buckley et al. |
| 2009/0047974 A1 | 2/2009 | Quinn |
| 2009/0067326 A1 | 3/2009 | Perrot et al. |
| 2009/0067397 A1 | 3/2009 | Seok |
| 2009/0116647 A1 | 5/2009 | Korus et al. |
| 2009/0156213 A1 | 6/2009 | Spinelli et al. |
| 2009/0177759 A1 | 7/2009 | Ogawa et al. |
| 2009/0245184 A1 | 10/2009 | Torres et al. |
| 2009/0247111 A1 | 10/2009 | Sennett et al. |
| 2009/0252165 A1 | 10/2009 | Zhang et al. |
| 2009/0296688 A1 | 12/2009 | Bakker et al. |
| 2009/0296689 A1 | 12/2009 | Bakker et al. |
| 2009/0298458 A1 | 12/2009 | Bakker et al. |
| 2009/0310692 A1 | 12/2009 | Kafle et al. |
| 2009/0325566 A1 | 12/2009 | Bell et al. |
| 2010/0118831 A1 | 5/2010 | Chen et al. |
| 2010/0146272 A1 | 6/2010 | Centonza et al. |
| 2010/0169953 A1 | 7/2010 | Hofer et al. |
| 2010/0190498 A1 | 7/2010 | Ha et al. |
| 2010/0216434 A1 | 8/2010 | Marcellino et al. |
| 2010/0255864 A1 | 10/2010 | Alfano et al. |
| 2010/0271978 A1 | 10/2010 | Gupta et al. |
| 2010/0275249 A1 | 10/2010 | McCann et al. |
| 2010/0279684 A1 | 11/2010 | Salkintzis |
| 2010/0293293 A1 | 11/2010 | Beser |
| 2010/0325714 A1 | 12/2010 | Iyer et al. |
| 2011/0028093 A1 | 2/2011 | Patel et al. |
| 2011/0040969 A1 | 2/2011 | Yao et al. |
| 2011/0047382 A1 | 2/2011 | Wang et al. |
| 2011/0055218 A1 | 3/2011 | Capuozzo et al. |
| 2011/0072101 A1 | 3/2011 | Forssell et al. |
| 2011/0103232 A1 | 5/2011 | Sood |
| 2011/0113252 A1 | 5/2011 | Krischer et al. |
| 2011/0149806 A1 | 6/2011 | Verma et al. |
| 2011/0149938 A1 | 6/2011 | Bajko |
| 2011/0154018 A1 | 6/2011 | Edstrom et al. |
| 2011/0162060 A1 | 6/2011 | Vijayakumar et al. |
| 2011/0216743 A1 | 6/2011 | Bachmann et al. |
| 2011/0188391 A1 | 8/2011 | Sella et al. |
| 2011/0274082 A1 | 11/2011 | Calhoun et al. |
| 2011/0280227 A1 | 11/2011 | McCann et al. |
| 2011/0286405 A1 | 11/2011 | Kim et al. |
| 2012/0008605 A2 | 1/2012 | Montemurro et al. |
| 2012/0017267 A1 | 1/2012 | McCann et al. |
| 2012/0054106 A1 | 3/2012 | Stephenson et al. |
| 2012/0057568 A1 | 3/2012 | Lim et al. |
| 2012/0076117 A1 | 3/2012 | Montemurro et al. |
| 2012/0076118 A1 | 3/2012 | Montemurro et al. |
| 2012/0099476 A1 | 4/2012 | Mahaffy et al. |
| 2012/0106514 A1* | 5/2012 | Zheng .................. H04W 36/32 370/331 |
| 2012/0116886 A1 | 5/2012 | Manku |
| 2012/0134349 A1 | 5/2012 | Jung et al. |
| 2012/0165056 A1 | 6/2012 | Kim et al. |
| 2012/0182970 A1 | 7/2012 | Ding et al. |
| 2012/0191780 A1 | 7/2012 | Sato et al. |
| 2012/0218918 A1 | 8/2012 | Takae et al. |
| 2012/0230308 A1 | 9/2012 | Saito et al. |
| 2012/0239755 A1 | 9/2012 | Filgueiras et al. |
| 2012/0243524 A1 | 9/2012 | Verma et al. |
| 2012/0244902 A1 | 9/2012 | Saito et al. |
| 2012/0246468 A1 | 9/2012 | Gabor |
| 2012/0281609 A1* | 11/2012 | Kasslin ................. H04W 48/14 370/312 |

(56) References Cited

U.S. PATENT DOCUMENTS

| | | |
|---|---|---|
| 2012/0296986 A1 | 11/2012 | Hassan et al. |
| 2013/0012260 A1 | 1/2013 | Salkintzis et al. |
| 2013/0028245 A1 | 1/2013 | Oerton et al. |
| 2013/0034023 A1 | 2/2013 | Jung |
| 2013/0039275 A1 | 2/2013 | Patil et al. |
| 2013/0051303 A1 | 2/2013 | Huang et al. |
| 2013/0064175 A1 | 3/2013 | Pandey et al. |
| 2013/0065627 A1 | 3/2013 | Jung et al. |
| 2013/0065633 A1 | 3/2013 | Sridhara et al. |
| 2013/0066936 A1 | 3/2013 | Krishnan et al. |
| 2013/0070738 A1 | 3/2013 | McCann et al. |
| 2013/0070739 A1 | 3/2013 | McCann et al. |
| 2013/0072248 A1 | 3/2013 | Bajko |
| 2013/0109313 A1 | 5/2013 | Kneckt et al. |
| 2013/0109314 A1 | 5/2013 | Kneckt et al. |
| 2013/0148643 A1 | 6/2013 | Abraham et al. |
| 2013/0166759 A1 | 6/2013 | Rajamani et al. |
| 2013/0170351 A1 | 7/2013 | Reznik et al. |
| 2013/0176897 A1 | 7/2013 | Wang et al. |
| 2013/0177002 A1 | 7/2013 | Sun et al. |
| 2013/0208582 A1 | 8/2013 | Wijnands et al. |
| 2013/0227152 A1 | 8/2013 | Lee et al. |
| 2013/0231151 A1 | 9/2013 | Kneckt et al. |
| 2013/0259034 A1 | 10/2013 | Klein et al. |
| 2013/0259038 A1 | 10/2013 | Anantharam et al. |
| 2013/0259040 A1 | 10/2013 | Anantharam et al. |
| 2013/0262850 A1 | 10/2013 | Canpolat et al. |
| 2013/0276076 A1 | 10/2013 | Gupta et al. |
| 2013/0281056 A1 | 10/2013 | Abraham et al. |
| 2013/0282793 A1 | 10/2013 | Swings et al. |
| 2013/0316705 A1 | 11/2013 | Kneckt et al. |
| 2013/0339478 A1 | 12/2013 | Edge et al. |
| 2014/0016612 A1 | 1/2014 | McCann et al. |
| 2014/0018037 A1 | 1/2014 | Shanmugavadivel et al. |
| 2014/0050167 A1 | 2/2014 | Smedman et al. |
| 2014/0050209 A1 | 2/2014 | Bajko et al. |
| 2014/0073356 A1 | 3/2014 | Siomina et al. |
| 2014/0078935 A1 | 3/2014 | Sun |
| 2014/0086134 A1 | 3/2014 | Smadi et al. |
| 2014/0091987 A1 | 4/2014 | Lee et al. |
| 2014/0101441 A1 | 4/2014 | Edstrom et al. |
| 2014/0164763 A1 | 6/2014 | Cherian et al. |
| 2014/0242985 A1 | 8/2014 | Kneckt et al. |
| 2014/0293978 A1 | 10/2014 | Fang et al. |
| 2015/0131641 A1 | 5/2015 | Ong et al. |
| 2015/0248702 A1 | 9/2015 | Chatterton |
| 2015/0373765 A1 | 12/2015 | Lee et al. |
| 2017/0318018 A1 | 11/2017 | Huang et al. |
| 2019/0159114 A1 | 5/2019 | McCann et al. |
| 2019/0289501 A1 | 9/2019 | McCann et al. |
| 2020/0329421 A1 | 10/2020 | McCann et al. |

FOREIGN PATENT DOCUMENTS

| | | |
|---|---|---|
| CN | 101141259 A | 3/2008 |
| CN | 101142788 A | 3/2008 |
| CN | 101150442 A | 3/2008 |
| CN | 101222388 A | 7/2008 |
| CN | 101317384 A | 12/2008 |
| CN | 101379801 A | 3/2009 |
| CN | 101395949 A | 3/2009 |
| CN | 101583151 A | 11/2009 |
| CN | 101682539 A | 3/2010 |
| CN | 101779417 A | 7/2010 |
| CN | 102100111 A | 6/2011 |
| CN | 102209303 A | 10/2011 |
| EP | 1919154 A1 | 5/2008 |
| EP | 1921818 A2 | 5/2008 |
| EP | 2076090 A1 | 7/2009 |
| EP | 2093967 A2 | 8/2009 |
| EP | 2445242 A1 | 4/2012 |
| EP | 2661122 A2 | 11/2013 |
| JP | 2002314546 A | 10/2002 |
| JP | 2004186753 A | 7/2004 |
| JP | 2008537657 A | 9/2008 |
| JP | 2008544588 A | 12/2008 |
| TW | 200947966 A1 | 11/2009 |
| WO | 0245456 A1 | 6/2002 |
| WO | 03092218 A1 | 11/2003 |
| WO | 2007082007 A2 | 7/2007 |
| WO | 2007083824 A1 | 7/2007 |
| WO | 2007103055 A2 | 9/2007 |
| WO | 2007116337 A2 | 10/2007 |
| WO | 2008049213 A1 | 5/2008 |
| WO | 2008049214 A1 | 5/2008 |
| WO | 2008107306 A1 | 9/2008 |
| WO | 2009063093 A2 | 5/2009 |
| WO | 2009101861 A1 | 8/2009 |
| WO | 2011056307 A2 | 5/2011 |
| WO | 2011073516 A1 | 6/2011 |
| WO | 2011115449 A2 | 9/2011 |
| WO | 2011132174 A1 | 10/2011 |
| WO | 2012060611 A2 | 5/2012 |
| WO | 2012091421 A2 | 7/2012 |

OTHER PUBLICATIONS

Chinese Office Action; Application No. 201910799303.7; dated Jan. 19, 2021; 18 pages.
Stephenson, Dave, et al.; "Venue Type Assisted Network Selection"; IEEE 802.11-07/2494r1; Sep. 17, 2007; 11 pages.
European Examination Report; Application No. 19191611.3; dated Jul. 23, 2021; 7 pages.
European Examination Report; Application No. 11715273.6; dated Jan. 13, 2016; 6 pages.
European Examination Report; Application No. 11715273.6; dated Jan. 25, 2017; 4 pages.
Indian Office Action; Application No. 7976/CHENP/2012; dated Aug. 30, 2018; 6 pages.
Japanese Office Action; Application No. 2012-557644; dated Oct. 17, 2013; 5 pages.
Japanese Office Action; Application No. 2014-019062; dated Nov. 21, 2014; 4 pages.
PCT International Search Report; Application No. PCT/IB2010/002932; dated May 9, 2011; 3 pages.
PCT Written Opinion of the International Searching Authority; Application No. PCT/IB2010/002932; dated May 9, 2011; 6 pages.
PCT International Search Report; Application No. PCT/IB2011/001006; dated Aug. 3, 2011; 4 pages.
PCT Written Opinion of the International Searching Authority; Application No. PCT/IB2011/001006; dated Aug. 3, 2011; 9 pages.
Canadian Office Action; Application No. 2,799,291; dated May 28, 2014; 3 pages.
Canadian Office Action; Application No. 2,799,291; dated Jun. 2, 2015; 4 pages.
Chinese Office Action; Application No. 201180033223.2; dated Jan. 22, 2015; 15 pages.
Chinese Office Action; Application No. 201180033223.2; dated Oct. 10, 2015; 12 pages.
European Examination Report; Application No. 11726170.1; dated May 9, 2016; 8 pages.
European Examination Report; Application No. 11726170.1; dated Nov. 19, 2018; 6 pages.
PCT International Search Report; Application No. PCT/IB2011/001008; dated Aug. 3, 2011; 4 pages.
PCT Written Opinion of the International Searching Authority; Application No. PCT/IB2011/001008; dated Aug. 3, 2011; 9 pages.
Canadian Office Action; Application No. 2,799,292; dated May 27, 2014; 3 pages.
Canadian Office Action; Application No. 2,799,292; dated Jun. 8, 2015; 4 pages.
Canadian Office Action; Application No. 2,799,292; dated Feb. 23, 2016; 4 pages.
Chinese Office Action; Application No. 201180033260.3; dated Jun. 3, 2015; 21 pages.
Chinese Office Action; Application No. 201180033260.3; dated Jan. 20, 2016; 7 pages.
European Examination Report; Application No. 11726171.9; dated May 9, 2016; 8 pages.

(56) References Cited

OTHER PUBLICATIONS

European Examination Report; Application No. 11726171.9; dated Nov. 20, 2018; 5 pages.
PCT International Search Report; Application No. PCT/IB2011/001023; dated Oct. 14, 2011; 3 pages.
PCT Written Opinion of the International Searching Authority; Application No. PCT/IB2011/001023; dated Oct. 14, 2011 5 pages.
Canadian Office Action; Application No. 2,799,295; dated Oct. 31, 2014; 4 pages.
Canadian Office Action; Application No. 2,799,295; dated Feb. 24, 2016; 4 pages.
Chinese Office Action; Application No. 201180033296.1; dated Dec. 31, 2014; 14 pages.
Chinese Office Action; Application No. 201180033296.1; dated Dec. 16, 2015; 8 pages.
European Examination Report; Application No. 11726172.7; dated Feb. 10, 2015; 4 pages.
PCT International Search Report; Application No. PCT/IB2011/001018; dated Dec. 5, 2011; 3 pages.
PCT Written Opinion of the International Searching Authority; Application No. PCT/IB2011/001018; dated Dec. 5, 2011; 3 pages.
Canadian Office Action; Application No. 2,799,293; dated Jun. 16, 2014; 2 pages.
Canadian Office Action; Application No. 2,799,293; dated Jul. 13, 2015; 6 pages.
Canadian Office Action; Application No. 2,799,293; dated Jun. 10, 2016; 5 pages.
Canadian Office Action; Application No. 2,799,293; dated May 17, 2017; 4 pages.
Chinese Office Action; Application No. 201180033197.3; dated Dec. 12, 2014; 20 pages.
Chinese Office Action; Application No. 201180033197.3; dated Aug. 18, 2015; 16 pages.
European Examination Report; Application No. 11733699.0; dated Jan. 15, 2016; 6 pages.
European Examination Report; Application No. 11733699.0; dated Sep. 6, 2016; 4 pages.
European Examination Report; Application No. 11733699.0; dated Jul. 19, 2017; 4 pages.
European Extended Search Report; Application No. 18157024.3; dated May 25, 2018; 10 pages.
PCT International Search Report; Application No. PCT/CA2012/050635; dated Dec. 10, 2012; 2 pages.
PCT Written Opinion of the International Searching Authority; Application No. PCT/CA2012/050635; dated Dec. 10, 2012; 7 pages.
Canadian Office Action; Application No. 2,848,754; dated Sep. 24, 2015; 4 pages.
Canadian Office Action; Application No. 2,848,754; dated Aug. 15, 2016; 5 pages.
Canadian Office Action; Application No. 2,848,754; dated Jul. 28, 2017; 4 pages.
Chinese Office Action; Application No. 201280044612.X; dated Nov. 28, 2016; 15 pages.
Chinese Office Action; Application No. 201280044612.X; dated Jun. 23, 2017; 10 pages.
European Extended Search Report; Application No. 12831400.2; Jul. 3, 2015; 10 pages.
European Examination Report; Application No. 12831400.2; Jun. 16, 2017; 6 pages.
European Summons to Attend Oral Proceedings; Application No. 12831400.2; dated May 25, 2018; 9 pages.
Korean Office Action; Application No. 10-2014-7008921; dated Mar. 23, 2015; 5 pages.
Korean Notice of Allowance; Application No. 10-2014-7008921; dated Sep. 18, 2015; 3 pages.
European Extended Search Report; Application No. 19171474.0; dated May 23, 2019; 11 pages.
PCT International Search Report; Application No. PCT/CA2012/050793; dated Jan. 16, 2013; 3 pages.

PCT Written Opinion of the International Searching Authority; Application No. PCT/CA2012/050793; dated Jan. 16, 2013; 5 pages.
Canadian Office Action; Application No. 2,854,947; dated Aug. 9, 2018; 3 pages.
Canadian Office Action; Application No. 2,854,947; dated Jun. 25, 2019; 5 pages.
Chinese Office Action; Application No. 201280066681.0; dated Mar. 10, 2017; 21 pages.
Chinese Office Action; Application No. 201280066681.0; dated Sep. 11, 2017; 18 pages.
Chinese Office Action; Application No. 201280066681.0; dated Jan. 15, 2018; 12 pages.
Chinese Reexamination Notification as Received in Co-pending Application No. 201280066681.0 dated Aug. 29, 2018; 13 pages. (No English translation available).
Chinese Reexamination Notification as Received in Co-pending Application No. 201280066681.0 dated Dec. 29, 2018; 13 pages. (No English translation available).
Chinese Rejection Decision as Received in Co-pending Application No. 201280066681.0 dated May 31, 2019; 20 pages. (No English translation available).
European Extended Search Report; Application No. 12847065.5; dated Jul. 13, 2015; 11 pages.
European Examination Report; Application No. 12847065.5; dated Oct. 12, 2018; 6 pages.
Korean Office Action; Application No. 10-2014-7015745; dated Apr. 29, 2015; 11 pages.
Taiwan Search Report; Application No. 102124777; dated Dec. 9, 2014; 1 page.
PCT International Search Report; Application No. PCT/CA2013/050540; dated Sep. 17, 2013; 3 pages.
PCT Written Opinion of the International Searching Authority; Application No. PCT/CA2013/050540; dated Sep. 17, 2013; 3 pages.
Canadian Office Action; Application No. 2,878,980; dated Feb. 19, 2019; 3 pages.
European Extended Search Report; Application No. 13816111.2; dated Feb. 3, 2016; 7 pages.
European Examination Report; Application No. 13816111.2; dated Mar. 29, 2017; 4 pages.
European Examination Report; Application No. 13816111.2; dated Dec. 4, 2017; 6 pages.
European Examination Report; Application No. 13816111.2; dated May 14, 2018; 4 pages.
European Summons to Attend Oral Proceedings; Application No. 13816111.2; dated Jan. 21, 2019; 6 pages.
European Extended Search Report; Application No. 18166755.1; dated Aug. 22, 2018; 6 pages.
European Examination Report; Application No. 18166755.1; dated Jul. 31, 2019; 4 pages.
European Extended Search Report; Application No. 19172928.4; dated Jul. 19, 2019; 7 pages.
Taiwan Office Action; Application No. 102116774; dated Oct. 27, 2014; 16 pages.
Taiwan Office Action; Application No. 102116774; dated Jun. 12, 2015; 16 pages.
PCT International Search Report; Application No. PCT/CA2013/050362; dated Aug. 2, 2013; 4 pages.
PCT Written Opinion of the International Searching Authority; Application No. PCT/CA2013/050362; dated Aug. 2, 2013; 5 pages.
Canadian Office Action; Application No. 2,872,882; dated Sep. 28, 2016; 4 pages.
Canadian Office Action; Application No. 2,872,882; dated Jun. 6, 2017; 3 pages.
European Extended Search Report; Application No. 13788377.3; dated Dec. 21, 2015; 8 pages.
European Examination Report; Application No. 13788377.3; dated Oct. 10, 2016; 6 pages.
European Examination Report; Application No. 13788377.3; dated Jun. 11, 2018; 7 pages.
Taiwan Search Report; Application No. 102122238; dated Dec. 24, 2014; 1 page.

(56) References Cited

OTHER PUBLICATIONS

Taiwan Search Report; Application No. 102122238; dated Sep. 21, 2015; 7 pages.
PCT International Search Report; PCT/CA2013/050539; dated Sep. 16, 2013; 3 pages.
PCT Written Opinion of the International Searching Authority; PCT/CA2013/050539; dated Sep. 16, 2013; 4 pages.
Canadian Office Action; Application No. 2,878,736; dated Mar. 6, 2019; 6 pages
European Extended Search Report; Application No. 13817511.2; dated Feb. 12, 2016; 9 pages.
European Examination Report; Application No. 13817511.2; dated Mar. 8, 2017; 5 pages.
European Examination Report; Application No. 13817511.2; dated Oct. 24, 2017; 4 pages.
European Extended Search Report; Application No. 19154310.7; dated Apr. 2, 2019; 15 pages.
PCT International Search Report; Application No. PCT/CA2014/050060; dated Apr. 15, 2014; 3 pages.
Wi-Fi Alliance; "Wi-Fi Certified Wi-Fi Direct"; Oct. 2010; 14 pages.
Notice of Allowance dated Jun. 23, 2021; U.S. Appl. No. 16/261,131, filed Jan. 29, 2019; 19 pages.
European Examination Report; Application No. 19171474.0; dated Jun. 2, 2021; 7 pages.
European Extended Examination Report; Application No. 21158898.3; dated Jun. 8, 2021; 11 pages.
PCT Written Opinion of the International Searching Authority; Application No. PCT/CA2014/050060; dated Apr. 15, 2014; 7 pages.
European Extended Examination Report; Application No. 14749467.8; dated Jun. 22, 2016; 8 pages.
European Examination Report; Application No. 14749467.8; dated Dec. 7, 2018; 7 pages.
"Proxy from FOLDOC"; Sep. 3, 2007; Retrieved from: http://foldoc.org/proxy on Dec. 17, 2019; 2 pages.
Georgantas, Konstantinos; "Fast Initial Authentication, a New Mechanism to Enable Fast WLAN Mobility" Master of Thesis; MSc Communication Systems, School of ICT, Royal Institute of Technology; Stockholm, Sweden Sep. 2011; 65 pages.
Gazis, Vangelis, et al.; "Towards the Functional Enhancement of 3GPP Networks with Reconfiguration Capacities"; Wireless Personal Communications; Jun. 2011; 28 pages.
Kempf, J., et al.; "An API for Service Location"; Request for Comments: 2614; Jun. 1999; 92 pages.
Final Office Action dated Oct. 18, 2019; U.S. Appl. No. 13/547,880, filed Jul. 12, 2012; 40 pages.
Advisory Action dated Jan. 7, 2020; U.S. Appl. No. 13/547,880, filed Jul. 12, 2012; 11 pages.
Office Action dated Mar. 25, 2020; U.S. Appl. No. 13/547,880, filed Jul. 12, 2012; 36 pages.
Notice of Allowance dated Jun. 17, 2020; U.S. Appl. No. 13/547,880, filed Jul. 12, 2012; 9 pages.
Office Action dated Dec. 27, 2019; U.S. Appl. No. 16/176,467, filed Oct. 31, 2018; 92 pages.
Notice of Allowance dated Apr. 8, 2020; U.S. Appl. No. 16/176,467, filed Oct. 31, 2018; 13 pages.
Office Action dated Nov. 27, 2019; U.S. Appl. No. 16/261,131, filed Jan. 29, 2019; 78 pages.
Final Office Action dated Mar. 17, 2020; U.S. Appl. No. 16/261,131, filed Jan. 29, 2019; 12 pages.
Advisory Action dated May 19, 2020; U.S. Appl. No. 16/261,131, filed Jan. 29, 2019; 4 pages.
Office Action dated Jun. 29, 2020; U.S. Appl. No. 16/261,131, filed Jan. 29, 2019; 12 pages.
Final Office Action dated Sep. 24, 2020; U.S. Appl. No. 16/261,131, filed Jan. 29, 2019; 17 pages.
Notice of Allowance dated Sep. 3, 2020; U.S. Appl. No. 16/428,350, filed May 31, 2019; 42 pages.

European Extended Search Report; Application No. 19211770.3; dated Dec. 17, 2019; 7 pages.
Chinese Office Action; Application No. 201810013191.3; dated Mar. 19, 2020; 13 pages.
European Examination Report; Application No. 19171474.0; dated Jul. 22, 2020; 5 pages.
European Extended Search Report; Application No. 19191611.3; dated Sep. 9, 2019; 14 pages.
European Summons to Attend Oral Proceedings; Application No. 18166755.1; dated Jan. 7, 2020; 7 pages.
European Brief Communication; Application No. 18166755.1; dated Apr. 23, 2020; 5 pages.
European Extended Search Report; Application No. 19211911.3; dated Feb. 12, 2020; 12 pages.
Canadian Office Action; Application No. 2,878,736; dated Apr. 9, 2020; 3 pages.
European Examination Report; Application No. 19154310.7; dated Mar. 9, 2020; 5 pages.
European Examination Report; Application No. 14749467.8; dated Jan. 2, 2020; 4 pages.
Juniper Networks; "P-CR 23.852 V1.2.0 SaMOG Layer 2 Solution"; SA WG2 Meeting #92; S2-123195; Barcelona, Spain; Jul. 9-13, 2012, 13 pages.
European Examination Report; Application No. 19172928.4; dated Dec. 21, 2020; 5 pages.
Bajko, Gabor; "IP Address Configuration During Association"; IEEE P802.11; dated Jul. 20, 2011; 5 pages.
Wi-Fi Alliance; "Wi-Fi Peer-to-Peer (P2P) Technical Specification"; Version 1.2; 2010; 159 pages.
Wi-Fi Alliance; "Wi-Fi Peer-to-Peer (P2P) Technical Specification"; Version 1.1; 2010; 159 pages.
Frikha, Mounir, et al.; "Micro Mobility in the IP Networks"; Telecommunication Systems; Apr. 2006; 16 pages.
Office Action dated Jun. 29, 2012; U.S. Appl. No. 12/780,603, filed May 14, 2010; 37 pages.
Office Action dated Jan. 2, 2013; U.S. Appl. No. 12/780,603, filed May 14, 2010; 35 pages.
Final Office Action dated Jun. 5, 2013; U.S. Appl. No. 12/780,603, filed May 14, 2010; 30 pages.
Office Action dated Dec. 17, 2013; U.S. Appl. No. 12/780,603, filed May 14, 2010; 27 pages.
Final Office Action dated Jun. 3, 2014; U.S. Appl. No. 12/780,603, filed May 14, 2010; 28 pages.
Notice of Allowance dated Sep. 2, 2014; U.S. Appl. No. 12/780,603, filed May 14, 2010; 7 pages.
Office Action dated Jun. 8, 2012; U.S. Appl. No. 12/780,709, filed May 14, 2010; 6 pages.
Office Action dated Aug. 23, 2012; U.S. Appl. No. 12/780,709, filed May 14, 2010; 13 pages.
Notice of Allowance dated Jan. 18, 2013; U.S. Appl. No. 12/780,709, filed May 14, 2010; 11 pages.
Office Action dated Apr. 3, 2012; U.S. Appl. No. 12/780,722, filed May 14, 2010; 15 pages.
Notice of Allowance dated Oct. 19, 2012; U.S. Appl. No. 12/780,722, filed May 14, 2010; 6 pages.
Notice of Allowance dated Feb. 5, 2013; U.S. Appl. No. 12/780,722, filed May 14, 2010; 6 pages.
Office Action dated May 2, 2012; U.S. Appl. No. 12/780,614, filed May 14, 2010; 5 pages.
Office Action dated Jul. 19, 2012; U.S. Appl. No. 12/780,614, filed May 14, 2010; 14 pages.
Office Action dated Nov. 16, 2012; U.S. Appl. No. 12/780,614, filed May 14, 2010; 6 pages.
Office Action dated Mar. 25, 2013; U.S. Appl. No. 12/780,614, filed May 14, 2010; 10 pages.
Final Office Action dated Jul. 19, 2013; U.S. Appl. No. 12/780,614, filed May 14, 2010; 7 pages.
Notice of Allowance dated Oct. 31, 2013; U.S. Appl. No. 12/780,614, filed May 14, 2010; 7 pages.
Office Action dated Nov. 16, 2012; U.S. Appl. No. 13/045,622, filed Mar. 11, 2011; 19 pages.
Final Office Action dated Jul. 12, 2013; U.S. Appl. No. 13/045,622, filed Mar. 11, 2011; 17 pages.

(56) References Cited

OTHER PUBLICATIONS

Office Action dated Oct. 11, 2012; U.S. Appl. No. 13/045,658, filed Mar. 11, 2011; 11 pages.
Final Office Action dated May 15, 2013; U.S. Appl. No. 13/045,658, filed Mar. 11, 2011; 11 pages.
Advisory Action dated Jul. 26, 2013; U.S. Appl. No. 13/045,658, filed Mar. 11, 2011; 3 pages.
Office Action dated Sep. 23, 2016; U.S. Appl. No. 13/045,658, filed Mar. 11, 2011; 77 pages.
Notice of Allowance dated Nov. 18, 2016; U.S. Appl. No. 13/045,658, filed Mar. 11, 2011; 7 pages.
Office Action dated Jul. 12, 2013; U.S. Appl. No. 13/234,799, filed Sep. 16, 2011; 16 pages.
Notice of Allowance dated Jan. 30, 2014; U.S. Appl. No. 13/234,799, filed Sep. 16, 2011; 7 pages.
Office Action dated Apr. 20, 2015; U.S. Appl. No. 14/298,289, filed Jun. 6, 2014; 10 pages.
Final Office Action dated Aug. 5, 2015; U.S. Appl. No. 14/298,289, filed Jun. 6, 2014; 34 pages.
Advisory Action dated Oct. 15, 2015; U.S. Appl. No. 14/298,289, filed Jun. 6, 2014; 3 pages.
Office Action dated Nov. 16, 2015; U.S. Appl. No. 14/298,289, filed Jun. 6, 2014; 13 pages.
Final Office Action dated Mar. 21, 2016; U.S. Appl. No. 14/298,289, filed Jun. 6, 2014; 21 pages.
Advisory Action dated Jun. 8, 2016; U.S. Appl. No. 14/298,289, filed Jun. 6, 2014; 4 pages.
Office Action dated Aug. 23, 2016; U.S. Appl. No. 14/298,289, filed Jun. 6, 2014; 8 pages.
Final Office Action dated Jan. 3, 2017; U.S. Appl. No. 14/298,289, filed Jun. 6, 2014; 13 pages.
Office Action dated Mar. 30, 2017; U.S. Appl. No. 14/298,289, filed Jun. 6, 2014; 7 pages.
Notice of Allowance dated Jun. 14, 2017; U.S. Appl. No. 14/298,289, filed Jun. 6, 2014; 8 pages.
Office Action dated Jul. 11, 2013; U.S. Appl. No. 13/407,444, filed Feb. 28, 2012; 14 pages.
Office Action dated Dec. 31, 2013; U.S. Appl. No. 13/407,444, filed Feb. 28, 2012; 11 pages.
Final Office Action dated Jun. 3, 2014; U.S. Appl. No. 13/407,444, filed Feb. 28, 2012; 11 pages.
Notice of Allowance dated Sep. 17, 2014; U.S. Appl. No. 13/407,444, filed Feb. 28, 2012; 5 pages.
Office Action dated Feb. 4, 2014; U.S. Appl. No. 13/548,864, filed Jul. 13, 2012; 15 pages.
Final Office Action dated Jul. 11, 2014; U.S. Appl. No. 13/548,864, filed Jul. 13, 2012; 10 pages.
Office Action dated Oct. 30, 2014; U.S. Appl. No. 13/548,864, filed Jul. 13, 2012; 10 pages.
Notice of Allowance dated May 1, 2015; U.S. Appl. No. 13/548,864, filed Jul. 13, 2012; 14 pages.
Office Action dated Jan. 14, 2014; U.S. Appl. No. 13/469,618, filed May 11, 2012; 28 pages.
Final Office Action dated Jul. 9, 2014; U.S. Appl. No. 13/469,618, filed May 11, 2012; 31 pages.
Office Action dated Jan. 21, 2015; U.S. Appl. No. 13/469,618, filed May 11, 2012; 26 pages.
Notice of Allowance Jul. 23, 2015; U.S. Appl. No. 13/469,618, filed May 11, 2012; 15 pages.
Office Action dated Dec. 31, 2014; U.S. Appl. No. 13/547,880, filed Jul. 12, 2012; 19 pages.
Final Office Action dated Aug. 27, 2015; U.S. Appl. No. 13/547,880, filed Jul. 12, 2012; 26 pages.
Advisory Action dated Dec. 2, 2015; U.S. Appl. No. 13/547,880, filed Jul. 12, 2012; 3 pages.
Advisory Action dated Jan. 20, 2016; U.S. Appl. No. 13/547,880, filed Jul. 12, 2012; 4 pages.
Office Action dated Jun. 13, 2016; U.S. Appl. No. 13/547,880, filed Jul. 12, 2012; 58 pages.
Final Office Action dated Dec. 14, 2016; U.S. Appl. No. 13/547,880, filed Jul. 12, 2012; 33 pages.
Advisory Action dated Mar. 13, 2017; U.S. Appl. No. 13/547,880, filed Jul. 12, 2012; 11 pages.
Office Action dated Mar. 28, 2017; U.S. Appl. No. 13/547,880, filed Jul. 12, 2012; 24 pages.
Final Office Action dated Dec. 8, 2017; U.S. Appl. No. 13/547,880, filed Jul. 12, 2012; 36 pages.
Office Action dated Jun. 13, 2018; U.S. Appl. No. 13/547,880, filed Jul. 12, 2012; 39 pages.
Final Office Action dated Oct. 18, 2018; U.S. Appl. No. 13/547,880, filed Jul. 12, 2012; 32 pages.
Advisory Action dated Jan. 29, 2019; U.S. Appl. No. 13/547,880, filed Jul. 12, 2012; 4 pages.
Office Action dated Apr. 5, 2019; U.S. Appl. No. 13/547,880, filed Jul. 12, 2012; 34 pages.
Office Action dated Jun. 30, 2015; U.S. Appl. No. 13/836,759, filed Mar. 15, 2013; 24 pages.
Notice of Allowance dated Nov. 18, 2015; U.S. Appl. No. 13/836,759, filed Mar. 15, 2013; 33 pages.
Office Action dated Mar. 31, 2016; U.S. Appl. No. 14/854,685, filed Sep. 15, 2015; 56 pages.
Final Office Action dated Sep. 16, 2016; U.S. Appl. No. 14/854,685, filed Sep. 15, 2015; 18 pages.
Notice of Allowance dated Nov. 23, 2016; U.S. Appl. No. 14/854,685, filed Sep. 15, 2015; 13 pages.
Office Action dated Apr. 8, 2016; U.S. Appl. No. 14/952,574, filed Nov. 25, 2015; 75 pages.
Final Office Action dated Oct. 20, 2016; U.S. Appl. No. 14/952,574, filed Nov. 25, 2015; 36 pages.
Advisory Action dated Jan. 11, 2017; U.S. Appl. No. 14/952,574, filed Nov. 25, 2015; 2 pages.
Office Action dated Feb. 15, 2017; U.S. Appl. No. 14/952,574, filed Nov. 25, 2015; 28 pages.
Notice of Allowance dated Jun. 30, 2017; U.S. Appl. No. 14/952,574, filed Nov. 25, 2015; 24 pages.
Office Action dated Aug. 11, 2017; U.S. Appl. No. 15/048,669, filed Feb. 19, 2016; 37 pages.
Notice of Allowance dated Dec. 8, 2017; U.S. Appl. No. 15/048,669, filed Feb. 19, 2016; 10 pages.
Office Action dated Nov. 16, 2018; U.S. Appl. No. 15/460,991, filed Mar. 16, 2017; 94 pages.
Notice of Allowance dated Mar. 11, 2019; U.S. Appl. No. 15/460,991, filed Mar. 16, 2017; 12 pages.
Office Action dated Feb. 22, 2018; U.S. Appl. No. 15/483,759, filed Apr. 10, 2017; 68 pages.
Notice of Allowance dated Jul. 18, 2018; U.S. Appl. No. 15/483,759, filed Apr. 10, 2017; 13 pages.
Office Action dated Sep. 11, 2018; U.S. Appl. No. 15/785,121, filed Oct. 16, 2017; 59 pages.
Notice of Allowance dated Nov. 30, 2018; U.S. Appl. No. 15/785,121, filed Oct. 16, 2017; 7 pages.
Office Action dated Mar. 22, 2018; U.S. Appl. No. 15/811,259, filed Nov. 13, 2017; 70 pages.
Final Office Action dated Nov. 1, 2018; U.S. Appl. No. 15/811,259, filed Nov. 13, 2017; 18 pages.
Advisory Action dated Jan. 14, 2019; U.S. Appl. No. 15/811,259, filed Nov. 13, 2017; 2 pages.
Notice of Allowance dated Feb. 25, 2019; U.S. Appl. No. 15/811,259, filed Nov. 13, 2017; 13 pages.
PCT International Search Report; Application No. PCT/IB2011/051040; dated Jun. 30, 2011; 4 pages.
PCT Written Opinion of the International Searching Authority; Application No. PCT/IB2011/051040; dated Jun. 30, 2011; 7 pages.
Taiwan Office Action; Application No. 100108467; dated Aug. 9, 2013; 12 pages.
PCT International Search Report; Application No. PCT/IB2011/051044; dated Jun. 30, 2011; 4 pages.
PCT Written Opinion of the International Searching Authority; Application No. PCT/IB2011/051044; dated Jun. 30, 2011; 7 pages.
Canadian Office Action; Application No. 2,793,375; dated Oct. 18, 2013; 3 pages.

(56) References Cited

OTHER PUBLICATIONS

Canadian Office Action; Application No. 2,793,375; dated Jun. 25, 2014; 3 pages.
Canadian Office Action; Application No. 2,793,375; dated Jul. 10, 2015; 5 pages.
Canadian Office Action; Application No. 2,793,375; dated May 2, 2016; 6 pages.
Canadian Office Action; Application No. 2,793,375; dated Apr. 7, 2017; 4 pages.
Chinese Office Action; Application No. 201180023969.5; dated Oct. 30, 2014; 20 pages.
Chinese Office Action; Application No. 201180023969.5; dated Jul. 20, 2015; 10 pages.
Office Action dated Sep. 2, 2021; U.S. Appl. No. 16/912,249, filed Jun. 25, 2020; 90 pages.
Chinese Office Action; Application No. 201910799303.7; dated Aug. 20, 2021; 24 pages.
Hiller, T., et al.; "A Container Type for the Extensible Authentication Protocol (EAP)"; Network Working Group; draft-hiller-eap-tiv-01.txt; May 2003; 16 pages.
McCann, Stephen; "Emergency URN Information"; IEEE 802.11-10/0026r0; Jan. 18, 2010; 6 pages.
Rosen, B., et al.; "Framework for Emergency Calling using Internet Multimedia"; draft-ietf-ecrit-framework-10; Jul. 27, 2009; 74 pages.
Schulzrinne, H., et al.; "Extensions to the Emergency Services Architecture for dealing with Unauthenticated and Unauthorized Devices"; draft-ietf-ecrit-unauthenticated-access-06.txt; Apr. 30, 2013; 38 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802 11e; Nov. 11, 2005; 211 pages.
Li, Wei, et al.; "A Reliable Active Scanning Scheme for the IEEE 802.11 MAC Layer Handoff"; IEEE; 2003; 4 pages.
Montemurro, Michael; "TGae Requirements and Use Cases"; IEEE 802.11-10/0093r5; Jan. 21, 2010; 6 pages.
Bajko, Gabor; "Tutorial on Location and Emergency Services"; Nokia; Sep. 10, 2008; 45 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 1: pp. 1-1369).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Draft P802.11-REVmb/D9.2; Jul. 2011; 2778 pages; (Part 2: pp. 1370-2778).
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11u; Feb. 25, 2011; 208 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11k; Jun. 12, 2008; 244 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11; Mar. 29, 2012; 2793 pages.
Lin, Chen-Han, et al.; "Mobile Intelligent Agent Technologies to Support Intelligent Handover Strategy"; Proceedings of the Workshop on Wireless, Ad Hoc and Sensor Network; vol. 1; 2005; 8 pages.
"Wi-Fi Peer-to-Peer (P2P) Technical Specification"; Draft Version 1.14; Wi-Fi Alliance Technical Committee P2P Task Group; Jun. 25, 2010; 22 pages.
"Draft Standard for Local and Metropolitan Area Networks: Media Independent Handover Services"; IEEE P802.21/D8.0; Dec. 2007; 343 pages.
Barber, Phillip, et al.; "GAS Version Control in 11ai"; Document: IEEE 802.11-11/1498-01-00ai; Oct. 24, 2011; 16 pages.
Bumiller, George; "Notes on Interworking with External Networks"; Document: IEEE 802.11-09/1272r2; Jul. 22, 2010; 156 pages.
Cao, Z., et al.; "DHCPv4 and DHCPv6 Options for Access Network Query Protocol Servers"; draft-cao-dhc-anqp-option-00; Jul. 9, 2012; 8 pages.
Kneckt, Jarkko, et al.; "Active Scanning Enabling FILS"; IEEE 802.11-11/1619r1; Jan. 16, 2012; 15 pages.
Campbell, Andrew T., et al.; "Design, Implementation, and Evaluation of Cellular IP"; IEEE Personal Communications; Aug. 2000; 8 pages.
Nakano, Hiroki; "Upper Layer Data on Management Frames"; IEEE 802.11-11/1003rl; Jul. 18, 2011; 17 pages.
Montemurro, Michael Peter, et al.; U.S. Appl. No. 17/146,189, filed Jan. 11, 2021; Title: Negotiation of Quality of Service (QoS) Information for Network Management Traffic in a Wireless Local Area Network (WLAN); 48 pages.
McCann, Stephen, et al.; U.S. Appl. No. 17/514,626; filed Oct. 29, 2021; Title: Discovering Network Information Available via Wireless Networks; 63 pages.

* cited by examiner

ADDRESS ASSIGNMENT FOR INITIAL AUTHENTICATION

CROSS-REFERENCE TO RELATED APPLICATIONS

This application is a continuation of U.S. patent application Ser. No. 13/547,880 filed Jul. 12, 2012 by Michael Peter Montemurro, et al. entitled "Address Assignment for Initial Authentication", which is incorporated by reference as if reproduced in its entirety.

BACKGROUND

Wireless network deployments, such as wireless local area networks ("WLANs"), allow mobile devices to access network and Internet services when within the proximity of wireless communication signals of those wireless networks. Through initial authentication communications with the WLAN, a mobile device or station ("STA") may obtain a network address, such as an Internet Protocol ("IP") address from an access point ("AP"), or an access network. In traditional WLANs, a mobile device associates to a WLAN and may either obtain an IP address using Dynamic Host Configuration Protocol ("DHCP") or make use of a statically configured IP address, which is usually configured locally within the WLAN itself. There is no expedited process for a mobile device to transition between networks without re-requesting an IP address. A mobile device may need to disconnect or disassociate with one network and authenticate/associate with a different network for the transition to occur.

DETAILED DESCRIPTION

Figure 1:
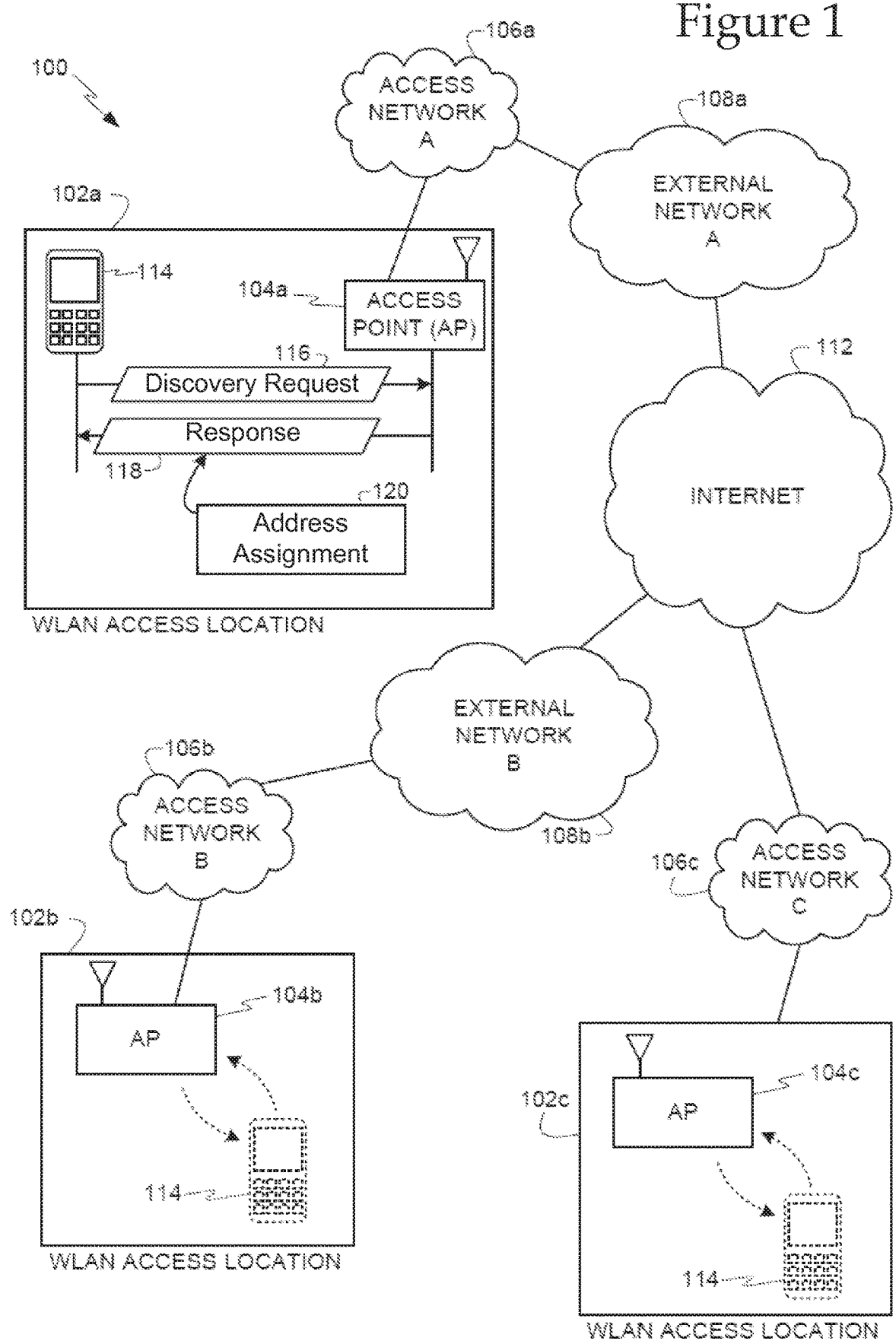
FIG. 1 illustrates a communication network.

The IP connection set-up may be streamlined to allow a mobile device to quickly switch between different WLAN Extended Service Sets ("ESSs"), by maintaining an IP address. The ESS forms a network comprising WLANs. In particular, the IP address assignment may be streamlined by requesting, during WLAN authentication and association, an IP address from a server that accesses a pool of IP addresses. The IP addresses are then provided to a number of networks, which allows a device to transition between the number of networks with an IP address that does not change during the transition. It may be impractical for a mobile device that moves between different networks (e.g. ESSs) to use a statically configured IP addresses for each network because the IP address is unknown between the networks. The usual alternative to using static IP addresses is to obtain an IP address from DHCP typically involving a multiple message exchange, which can take more time than a device uses to authenticate and associate with a WLAN, so the device cannot quickly obtain an IP address. Accordingly, the assignment of IP addresses may be from a central source (e.g. IP server in FIGS. 3-4) with access to a pool of IP addresses that allows the device to maintain the address while transitioning between networks that utilize the IP server.

The disclosed systems and methods allow mobile devices to maintain an address (e.g. an IP address) while transitioning between networks (e.g., ESSs). The transition may occur seamlessly, such that a consumer never loses network connectivity despite transitioning between networks. The mobile device may receive an IP address from a pool of addresses, such that the mobile device can maintain the same IP address as the mobile device transitions between networks. The transition may be enabled using a protocol (e.g. Link Control Protocol ("LCP")) where the mobile device IP address (from an "LCP" pool) remains the same while the mobile device transitions between networks. The transition is enabled because the assignment of the IP address is not from the AP subnet (typically with an associated DHCP server), but rather the assignment of the IP address is from the network.

The communication for enabling such a transition may include the transmission of discovery information associated with a network, to the mobile device, regarding the availability of a suitable protocol prior to association with that network. This pre-association communication may be retrieved through an advertisement protocol, such as Access Network Query Protocol ("ANQP"), which allows a mobile device to retrieve information about a network prior to associating with that network. ANQP may allow a mobile device to request network information or discovery information prior to receiving the IP address and establishing network connectivity. Communications prior to network association may be referred to as pre-association communications. ANQP may allow a device to determine that a network, to which a mobile device may transition to, operates under a particular protocol (e.g. LCP) which allows the same IP address to be utilized during and upon transition to that network.

Link Control Protocol ("LCP") is part of the point-to-point protocol ("PPP") in which sending and receiving devices send out LCP packets that establish the communication techniques. In particular, the LCP protocol may establish, configure, and test data-link Internet connections. Before establishing communications over a point-to-point link, each end of the PPP link sends out LCP packets. The LCP packets may monitor the identity of a linked device and either accept or reject the device. The LCP packets may also include the ability to establish packet size, search for configuration errors, and terminate the link if necessary. Once the LCP packet accepts the link, communications can be transported on the network, otherwise, the link is terminated. As described below, LCP may be an exemplary protocol that is utilized with the IEEE 802.11 WLAN protocols.

The PPP protocol may establish point-to-point link layer connections for establishing layer 2 ("L2") and layer 3 ("L3") (see e.g. FIG. 2) connectivity over a point-to-point link. The PPP protocol may makes use of LCP frames to establish L2 and L3 connectivity. The Internet Protocol Control Protocol ("IPCP") allows a device to request an IP address and Domain Name System ("DNS") configuration over LCP. However the configuration may be insufficient to establish network connectivity over a local area network ("LAN"). The PPP protocol may be used for link layer and IP layer network establishment. The mobile device may use IPCP to request an IP address and DNS server addresses. The PPP protocol may be encapsulated for authentication (e.g. Extended Authentication Protocol ("EAP")) purposes, which may be used by IEEE 802.11 networks.

As described below, networks (e.g. ESSs) that are capable of this transition of the same IP address, will be able to notify mobile devices of this capability with pre-association communications. In other words, a mobile device may need to know if a transition between networks (ESSs) is possible utilizing the same IP address and that information may be conveyed with ANQP. In particular, the networks may advertise whether they access the same pool of IP addresses. All networks from the same pool would assign IP addresses from the pool and allow transitioning between networks with the same IP address.

The transitioning between networks (e.g. ESSs) may be especially useful in an environment where mobile users are frequently entering and leaving the coverage area of a specific ESS. Every time the mobile device enters an ESS, the mobile device may do an initial link set-up to establish wireless local area network ("WLAN") connectivity, which includes the receiving of an IP address dynamically with DHCP. IEEE 802.11r provides a solution to allow a mobile device to transition between Basic Service Sets ("BSSs"), within the same mobility domain that restricts them to a single network (e.g. ESS). However, each new AP may require a dynamically created IP address.

A basic service set ("BSS") may be a set of stations ("STAs") or mobile devices that can communicate with each other. According to the IEEE 802.11 standard a STA may be a mobile device, an AP or a mesh device "MSTA." Each AP and its mobile devices may be known as a BSS. The BSS may include mobile devices that have successfully synchronized using the JOIN service primitives and one mobile device that has used the START primitive. Membership in a BSS may not imply that wireless communication with all other members of the BSS is possible.

Although not specified, the messages and protocols described below may be bi-directional and can flow from a mobile device to an AP and vice-versa. In infrastructure mode, a single AP together with all associated STAs is called a BSS. Every BSS has an identification (ID) called the BSSID, which may be the MAC address of the AP servicing the BSS. The simplest BSS may include one AP and one STA. There may be two types of BSS: 1) independent BSS (also referred to as IBSS); and 2) infrastructure BSS. An independent BSS ("IBSS") may be an ad-hoc network of STAs that contains no APs, which means they may not connect to any other BSS.

A common distribution system ("DS") and two or more BSSs may create an extended service set ("ESS") a network. The ESS may be a set of one or more interconnected BSSs and integrated LANs that appear as a single BSS to the logical link control layer at any mobile device associated with one of those BSSs. APs in an ESS are connected by a distribution system. The APs communicate amongst themselves to forward traffic from one BSS to another to facilitate movement of mobile devices between BSSs through the distribution system. The distribution system is the backbone of the WLAN and may be constructed of either a wired LAN or wireless network. The distribution system is a thin layer in each AP that determines the destination for traffic received from a BSS. The distribution system determines if traffic should be relayed back to a destination in the same BSS, forwarded on the distribution system to another AP, or sent into the wired network to a destination not in the extended service set. Communications received by an AP from the distribution system are transmitted to the BSS to be received by the destination mobile device.

Network equipment outside of the ESS, views the ESS and all of mobile devices within the ESS as a single MAC-layer network where all mobile devices are physically stationary. Thus, the ESS "hides" the mobility of the mobile devices from everything outside the ESS. In other words, components outside of the ESS need not be aware of or informed about the mobility of the mobile devices within the ESS. This level of indirection provided by the IEEE 802.11 architecture allows existing network protocols that have no concept of mobility to operate correctly with a WLAN where there is mobility. With an ESS, the entire network may appear as an independent basic service set ("IBSS") to the Logical Link Control layer ("LLC"). Accordingly, mobile devices within the ESS may communicate or even move between BSSs transparently to the LLC. Each BSS may have an identity ("ID") called a service set identity ("SSID") which is a 32-byte (maximum) character string. As described below, separate ESSs that access the same pool of IP addresses may assign an IP address to a device such that the IP address can remain the same as the device transitions between those ESSs accessing the same pool of IP addresses.

Mobile devices that transition between networks (e.g. ESSs) may include mobile communication devices, mobile computing devices, or any other device capable of communicating wirelessly with a wireless network. Such devices may also be referred to as terminals, wireless terminals, mobile devices, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc.

Some mobile devices may transition between ESSs, which may include a wireless local area network ("WLAN"). Network discovery and connectivity in a WLAN may occur through standards that define access, control and communications in networks, such as the communication standard known as IEEE® (Institute for Electrical and Electronics Engineers) 802.11, which, among other things, includes features describing "interworking with external networks." The "interworking" standard is part of the IEEE 802.11-2012 base standard, and was formerly part of the amendment document IEEE 802.11u. Alternatively, the network discovery and connectivity may be subject to other parts of the IEEE 802.11 standard and other wireless communication standards including WLAN standards including any IEEE® 802.xx standard (e.g. IEEE 802.15, IEEE 802.16, IEEE 802.19, IEEE 802.20, and IEEE 802.22), personal area network standards, wide area network standards, or cellular communication standards.

One exemplary network may be a WLAN and is described below. Alternatively, the mobile devices may receive an IP address or other address for accessing a network through other protocols and architectures, including a cellular network or a WiMax network. The network may comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another. The assignment of IP addresses by networks may be implemented in many environments providing WLAN access for network connectivity or in WLAN access locations or environments in which it may be expected that one or more users carrying respective mobile devices will associate with (i.e., join or connect to) and disassociate from a wireless network, AP, or WLAN as they enter and exit the WLAN access locations or environments.

Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service can use wireless network access and/or Internet-access services based on such a subscription when the subscriber is in communication proximity of the WLAN with an appropriate mobile device. An external network (e.g. ESS) may include one or more WLANs or hotspots.

In accordance with the embodiments described herein, mobile devices may request network capabilities (such as the IP address assignment features) from WLANs using an Access Network Query Protocol ("ANQP"). ANQP supports information retrieval from an Advertisement Server that supports a Generic Advertisement Service ("GAS"). ANQP and GAS are defined in IEEE® 802.11u™ and also IEEE® 802.11-2012™, the entire disclosures of which are incorporated by reference. Generic Advertisement Service ("GAS") may serve as a transport mechanism, at layer-2 (see e.g. FIG. 2), for an advertisement protocol such as ANQP. The advertisement protocol may connect the mobile device to one of several interworked servers. The advertisement protocol allows the transmission of frames between a mobile device and a server in the network prior to network connectivity. For example, GAS provides support for network selection by a mobile device as well as for communication between the mobile device and other information resources in the network before the mobile device associates with a WLAN. The mobile device may be connected to a layer-2 radio service, without exchanging any authentication parameters or without having a recognized session (because no session keys are established and no internet protocol "IP" address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol. The advertisement protocol information would be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if EAP-SIM (or EAP-AKA) were to be the authentication protocol, any advertisement protocol information encapsulated (i.e. securely carried) within a suitable EAP-TLV frame during the same EAP transaction may also be protected by the SIM credentials.

Access Network Query Protocol ("ANQP") is an advertisement protocol and operates as a query and response protocol used by a mobile device to discover a range of information from a server including accessible roaming partners internet protocol address type availability, and other metadata useful in the mobile device's network selection process. ANQP is capable of discovering information about hotspots or wireless networks, prior to the mobile device establishing network connectivity and associating with that network. For example, ANQP may be used to verify whether networks support the IP address assignment protocol that allows transitions between multiple networks that share a pool of IP addresses. In addition to being defined in IEEE® 802.11u, additional ANQP messages may alternatively or additionally be defined in the Wi-Fi Alliance ("WFA") Hotspot 2.0 (also referred to as Passpoint) specifications. These ANQP extensions within the WFA Hotspot 2.0 specifications may be referred to as Hotspot ("HS") 2.0 ANQP elements. Alternatively, other advertisement protocols (e.g., Registered Location Query Protocol "RLQP" as defined in IEEE® 802.11af and Hotspot Registration Protocol "HRP" as defined in Wi-Fi Alliance Hotspot 2.0) may also be used.

FIG. 1 illustrates a communication network 100. Network information may be communicated during network discovery using ANQP over the communications network 100. The communication network 100 includes a plurality of WLAN access locations 102a-c having respective APs 104a-c that provide access to respective access networks 106a-c. The APs 104a-c are further described with respect to FIG. 6. The access network A 106a provides access to an external network A 108a and the access network B 106b provides access to an external network B 108b. Unlike the access networks A 106a and B 106b that do not connect directly to the Internet 112, the access network C 110 may connect directly to a publicly accessible network like the Internet. Thus, the access network C 106c may be a public network, while the access networks A 106a and B 106b may be private networks. Any of the described networks may form part of an ESS.

In one embodiment, each of the external networks A 108a and B 108b may be a subscription service provider network ("SSPN") owned or operated by data subscription service providers, Internet subscription service providers ("SP"), media (e.g., audio/video) subscription service providers, wireless communications subscription service providers, or any combination thereof. The external networks A 108a and B 108b are connected to the Internet 112 and may, for example, provide subscription-based Internet access to mobile devices. In some implementations, roaming agreements between different subscription service providers may enable the external networks A 108a and B 108b to support roaming connections for mobile devices associated with other subscription service providers. In one embodiment, the external networks 108a-b are ESSs. Alternatively, networks 106a-c may be ESSs.

The WLAN access location 102a illustrates a mobile device 114 in wireless range of the AP 104a. The mobile device 114 is further described with respect to FIG. 5. The AP 104a connects with the access network A 106a, which may provide a direct or indirect connection to other networks, including publicly accessible network like the Internet 112. Prior to the mobile device 114 associating with the access network A 106a, mobile device 114 sends a discovery request 116 to the AP 104a. The AP 104a may respond with a discovery response 118. In alternative embodiments, the discovery request 116 may originate from the AP 104a and the discovery response 118 may be from the mobile device 114, such as with mesh, peer to peer, ad-hoc or Wi-Fi Direct networks. The discovery request 116 may include an indication whether the AP accepts a protocol (e.g. LCP) for the address assignment from an entity (e.g. IP Server in FIGS. 3-4) that allows transitions across networks (e.g. ESSs) with the same IP address. The discovery response 118 may indicate compliance with such a protocol. Accordingly, the discovery request 116 and the discovery response 118 may be referred to as address assignment communications 120. The communications (discovery request 116 and the discovery response 118) establishing network compliance with a protocol that allows transitioning with the same IP address may be made in a pre-associated state relative to the access network A 106a and may also be referred to as discovery communications. In one embodiment, the address assignment communications 120 may include an IP address from a pool of IP addresses that is assigned to the mobile device 114 and allows the mobile device 114 to transition between multiple networks using the same IP address. The transmission of the IP address may be made before or as part of network association.

The discovery communications (request 116 and response 120) may be exchanged at a media access control ("MAC") sub-layer of a data link layer of the Open Systems Interconnection ("OSI") Reference Model without needing to use operations at or above an internet protocol ("IP") layer (i.e., a network layer) and without needing to otherwise provide access to the IP layer. The layers in which the discovery communication occurs are further illustrated in FIG. 2.

Each of the APs 104a-c and the mobile device 114 may include a network adapter or network interface card that facilitates connections to a wireless medium. The network interface component may be referred to as a station ("STA"). Each of the access networks 106a-c and the external networks 108a-b may be associated with one or more ESSs and an IP Server with a pool of IP addresses may distribute IP addresses to mobile device 114, which will allow the mobile device 114 to transition between networks using the same IP address.

Figure 2:
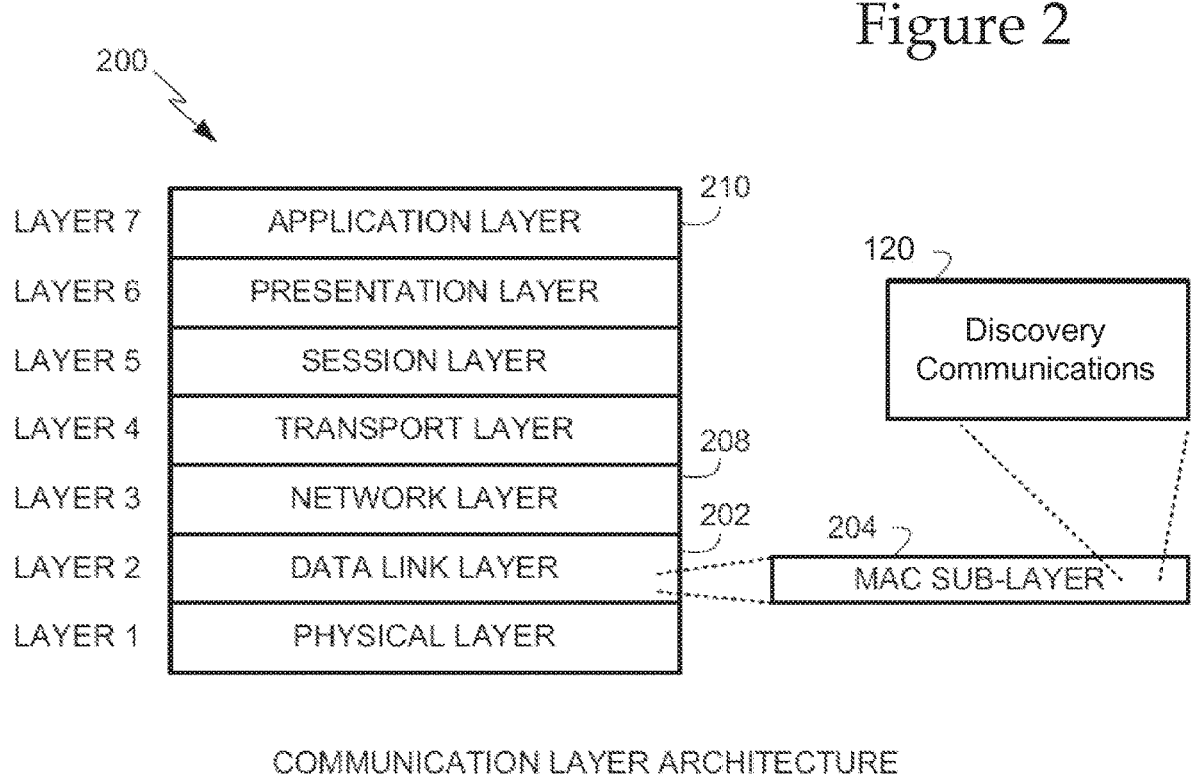
FIG. 2 illustrates a communication layer architecture.

FIG. 2 illustrates a communication layer architecture 200. The communication layer architecture 200 includes seven layers which may be implemented in accordance with the Open Systems Interconnection ("OSI") Reference Model. The communication layer architecture 200 includes a data link layer 202, which includes a media access control ("MAC") sub-layer 204. Mobile devices (e.g., the mobile device 114 of FIG. 1) may provide network information or discovery communications, such as the address assignment communications 120 (e.g. the discovery request 116 and the discovery response 118) with wireless APs (e.g., the APs 102a-c of FIG. 1) at the MAC sub-layer 204. A mobile device may access information from a memory or other hardware of the mobile device at the MAC sub-layer 204 without needing to perform operations at or above an internet protocol layer (e.g., a network layer 208) and without needing to provide access to the internet protocol layer. Mobile devices (e.g., the mobile device 114 of FIG. 1) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., web-browser operations) at an application layer.

Some communications or authentication techniques that use hypertext transfer protocol ("HTTP") or other internet protocol processes may require establishing a connection between a mobile device and an AP at one or more of the layers between and including the network layer 208 and an application layer 210 of the communication layer architecture 200. In these applications, discovery communications may not require a connection or access to the network layer 208 or any layers within a protocol suite. An inclusion of a discovery communication 120 on the MAC sub-layer 204 may allow for a mobile device to communicate with a network without associating with the network.

Figure 3:
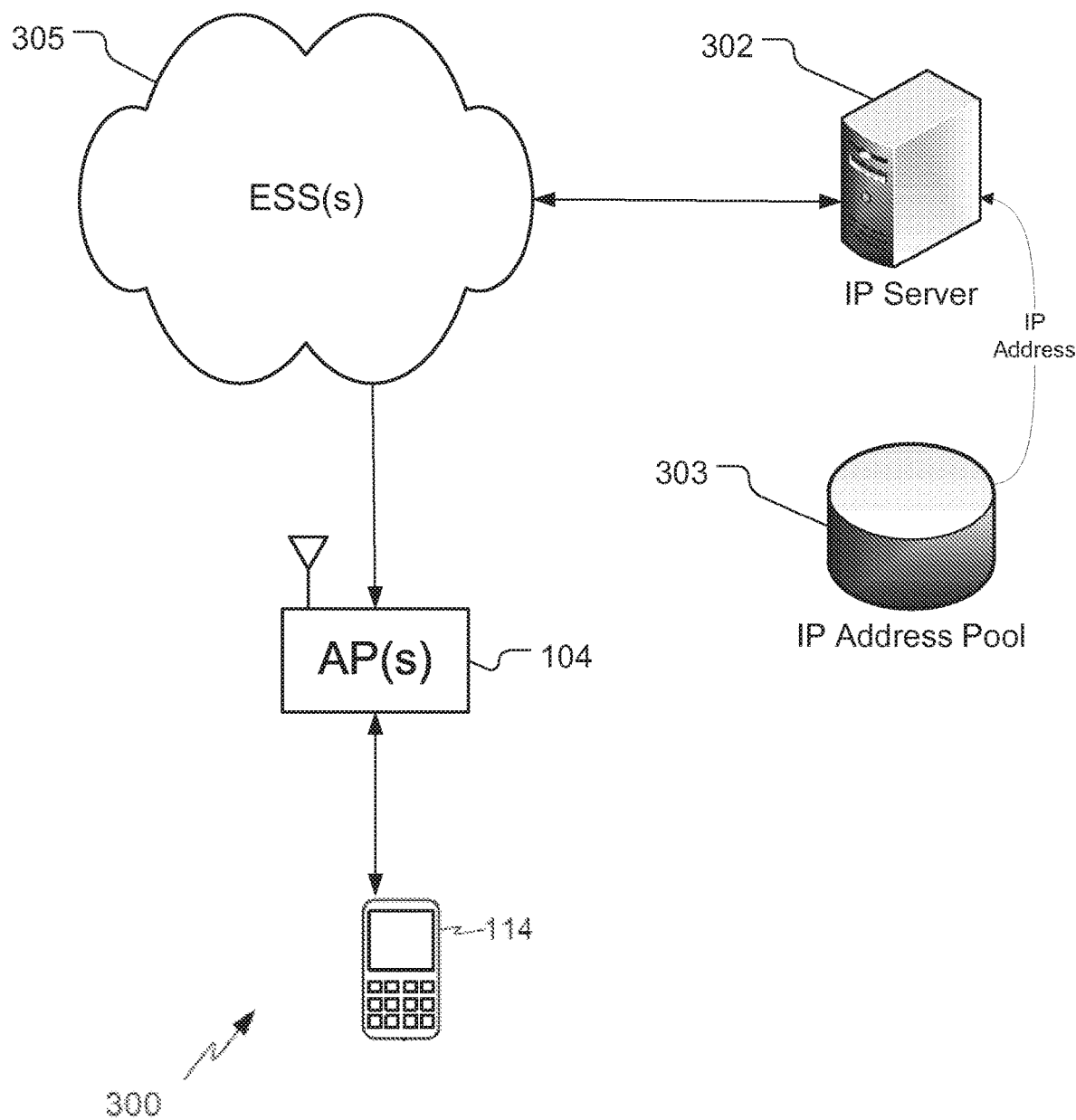
FIG. 3 illustrates an alternative communication network.
Figure 4:
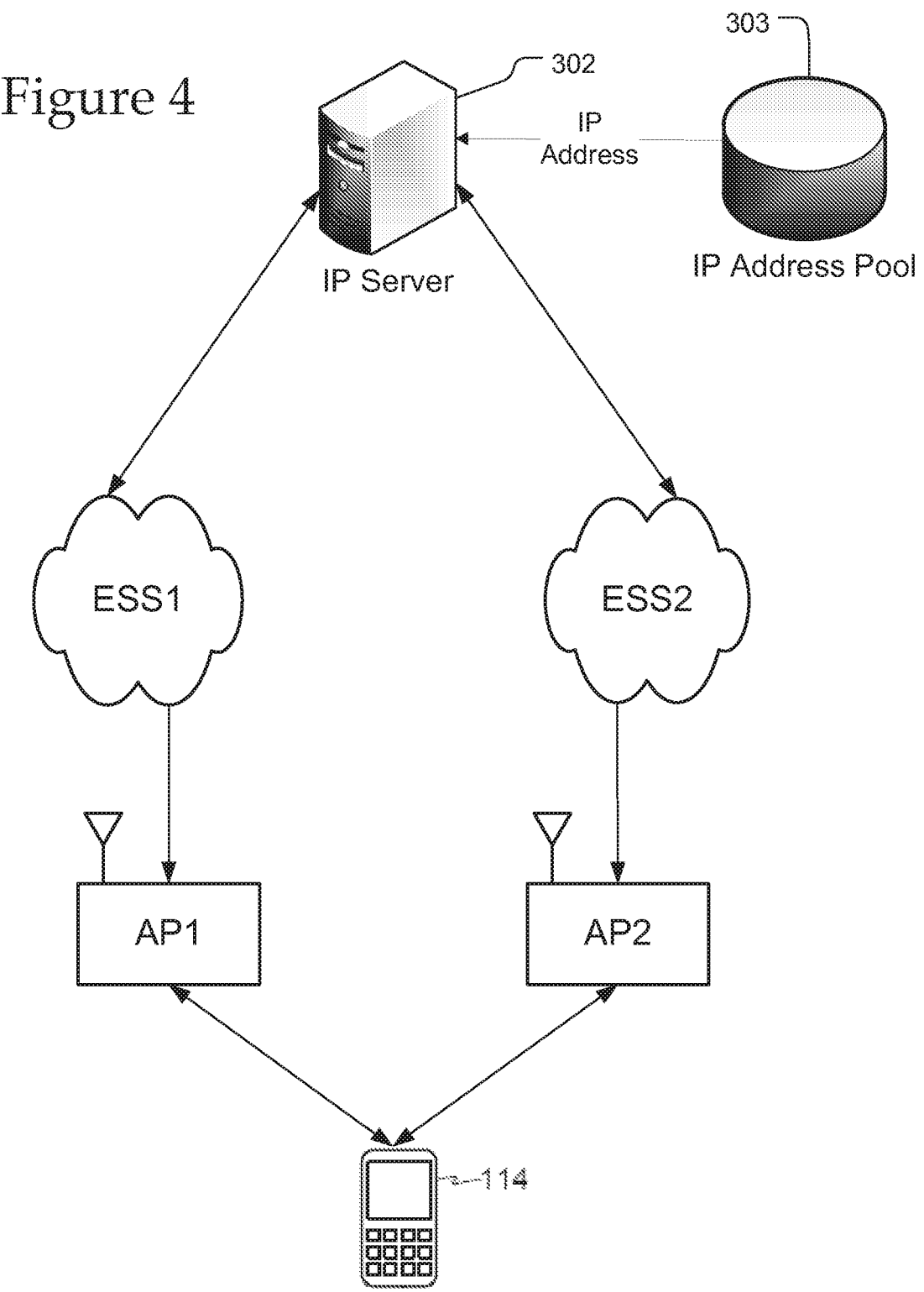
FIG. 4 illustrates another alternative communication network.

The discovery communications indicating compatibility with a protocol (e.g. LCP) with ESSs that share a pool of IP addresses may be available via APs using the MAC sub-layer. FIGS. 3-4 illustrate an IP Server that accesses the pool of IP addresses that is used to assign an IP address to the mobile device. This functionality (i.e., the compatibility with the protocol) may be indicated through a particular bit added to the Extended Capability information element ("IE") that indicates the ability to transition between ESSs with the same IP address.

FIG. 3 illustrates an alternative communication network 300. In particular, the network 300 illustrates the communication between the mobile device 114, the AP 104, and one or more ESSs 305. An IP Server 302 may be coupled with an IP address pool 303. The IP address pool 303 includes a pool of IP addresses that the IP server 302 provides to the ESSs 305. When IP addresses from the IP address pool 303 are assigned by the IP server 302 through different ESSs 305 to the mobile device 114, that device can transition between the networks using the same IP address.

The IP server 302 may be any computing device or server residing in the network that accesses IP addresses and provides them to a mobile device. The server typically has a trust relationship with all APs within the network. The IP address pool 303 may be a database that stores available IP addresses that are provided by the networks to the mobile devices accessing those networks. In one embodiment, the IP address pool 303 and IP server 302 may be a single unit or computing device. For example, the IP server 302 memory may store the IP addresses that are provided.

FIG. 4 illustrates another alternative communication network. In particular, FIG. 4 explicitly illustrates multiple ESSs (ESS1 and ESS2) that both receive IP address from the IP server 302. As discussed above, the IP server 302 accesses a pool of IP addresses 303 from which the mobile device 114 receives an IP address. As illustrated in FIG. 4, the mobile device 114 may transition between networks by moving from the range of the first AP AP1 to the range of the second AP AP2. Since AP1 is part of ESS1 and AP2 is part of ESS2, the transition between APs is also a transition between ESSs. However, since the mobile device 114 IP address is from the IP address pool 303, the IP address of the mobile device 114 does not need to change when transitioning between ESS1 and ESS2. The transition from the mobile device perspective may be seamless. The connection with the IP server for both ESSs implies that they each are compatible with a protocol, such as LCP, that allows for the utilization of the same IP address. LCP or a comparable protocol is further described below.

In alternative embodiments, there may be more ESSs that are all connected with the IP server 302. Accordingly, an IP address from the IP address pool 303 may allow the mobile device 114 to transition between any of the ESSs, while maintaining that IP address. The transition by the mobile device 114 may include leaving the range of one AP and entering the range of another AP where those APs are supported by different ESSs.

Figure 5:
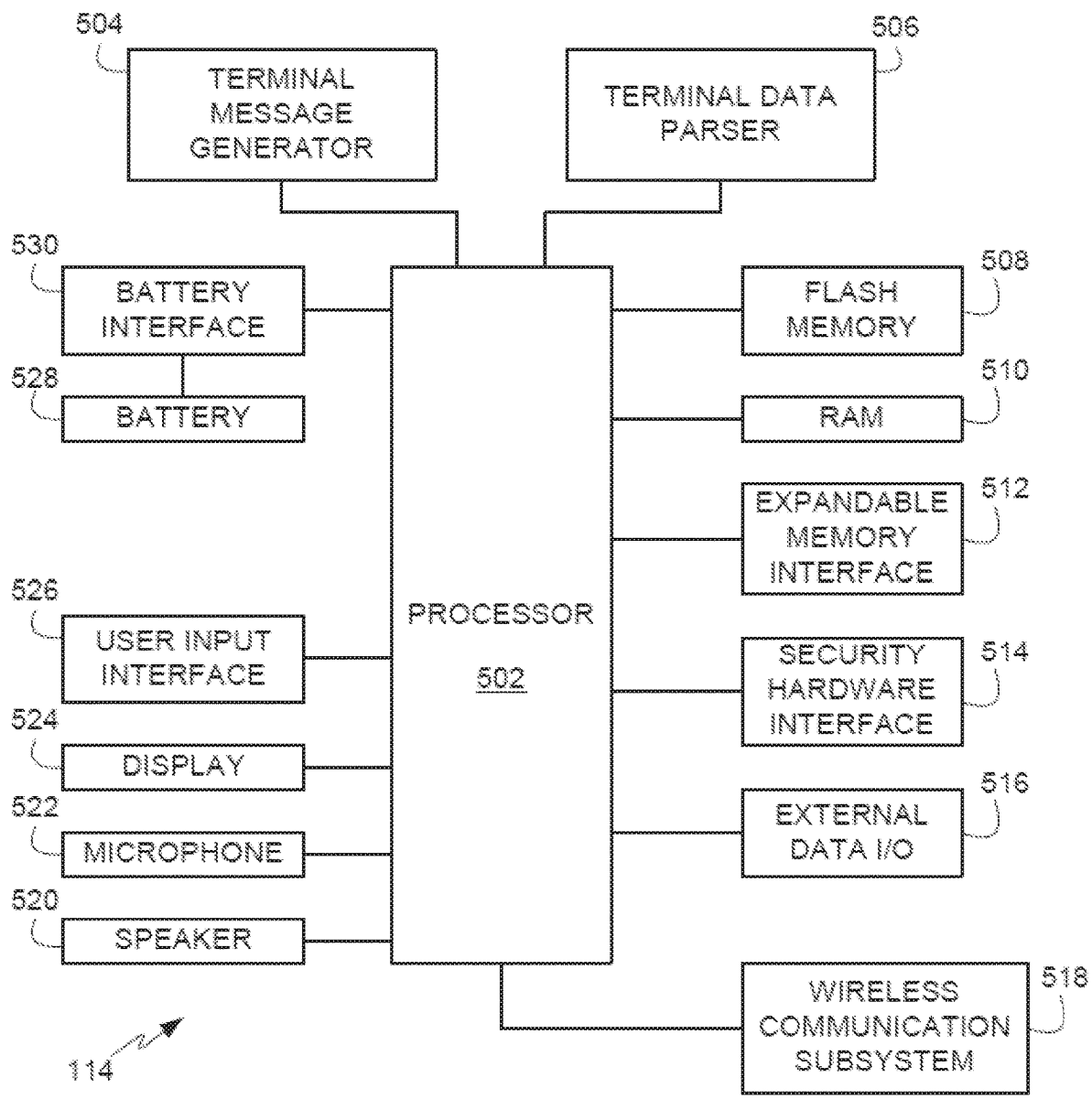
FIG. 5 illustrates a mobile device.

FIG. 5 illustrates a mobile device 114 as shown in FIGS. 1, 3, and 4. The mobile device 114 includes a processor 502 that may be used to control the overall operation of the mobile device 114. The processor 502 may be implemented using a controller, a general purpose processor, a digital signal processor, dedicated hardware, or any combination thereof. The processor 502 may include a central processing unit, a graphics processing unit, a digital signal processor or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The mobile device 114 also includes a terminal message generator 504 and a terminal data parser 506. The terminal message generator 504 may generate messages such as the discovery request 116 and discover response 118 for communicating network information such as the address assignment communications 120 from FIG. 1. The terminal data parser 506 may be used to retrieve network information from memory (e.g., random access memory 510, etc.). For example, the terminal data parser 506 may retrieve network information such as an IP address that is cached in the mobile device 114 after receipt from a WLAN (e.g., the access networks 106a-c of FIG. 1).

In the illustrated embodiment, the terminal message generator 504 and the terminal data parser 506 are shown as separate from and connected to the processor 502. In alternative embodiments, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any combination of hardware, firmware, and/or software. For example, one or more integrated circuits, discrete semiconductor components, and/or passive electronic components may be used. For example, the terminal message generator 504 and the terminal data parser 506, or parts thereof, may be implemented using one or more circuits, programmable processors, application specific integrated circuits, programmable logic devices, field programmable logic devices, etc.

The terminal message generator 504 and the terminal data parser 506, or parts thereof, may be implemented using instructions, code, and/or other software and/or firmware, etc. stored on a machine accessible medium and executable by, for example, a processor (e.g., the processor 502). The terminal message generator 504 or the terminal data parser 506 may be stored on or include a tangible storage medium or memory. For example, the terminal message generator 504 or the terminal data parser 506 may be implemented in software stored on a memory that is executable by the processor 502. Alternatively, the terminal message generator 504 and/or the terminal data parser 506 may be implemented in hardware with software functions. The memory for storing software associated with the terminal message generator 504 and/or the terminal data parser 506 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 510 for the processor 502, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 502.

The mobile device 114 may include a FLASH memory 508, a random access memory 510, and/or an expandable memory interface 512 coupled with the processor 502. The FLASH memory 508 may store computer readable instructions and/or data. In some embodiments, the FLASH memory 508 and/or the RAM 510 may store the network information 120 from FIG. 1 and instructions for communicating that network information 120. The processor 502 may be coupled with the memory (e.g. the FLASH memory 508, or the RAM 510) for storing software instructions executable by the processor 502. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 502 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The mobile device 114 may include a security hardware interface 514 to receive credentials (e.g. a SIM/USIM card or Near Field Communication "NFC" entity) from a wireless service provider. These credentials may be used for network discovery communications including authentication of the mobile device 114 for establishing a connection with a WLAN-supported network. The mobile device 114 may be provided with an external data I/O interface 516. The external data I/O interface 516 may be used by a user to transfer information to the mobile device 114 through a wired or wireless medium.

The mobile device 114 may include wireless communication subsystem 518 to enable wireless communications with APs (e.g., the APs 104a-c of FIG. 1). Although not shown, the mobile device 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 may be implemented using a BLUETOOTH® radio, a ZIGBEE® device, a wireless USB device, an ultra-wideband radio, a Near Field Communications ("NFC") device, or a Radio Frequency Identifier ("RFID") device.

The mobile device 114 may include a user interface for communicating with the mobile device. The user interface may be separate component or it may include a speaker 520, a microphone 522, a display 524, and a user input interface 526. The display 524 may be a liquid crystal display, an organic light emitting diode, a flat panel display, a solid state display, a cathode ray tube, a projector, or other now known or later developed display device for outputting determined information. The user input interface 526 may include alphanumeric keyboard and/or telephone-type keypad, a multi-direction actuator or roller wheel with dynamic button pressing capability, a touch panel, etc. The network discovery information that is communicated with a network prior to connection may be communicated with or without each of the user interfaces described herein. The speaker, 520, the microphone 522, the display 524, the user input interface 526, and/or any combination thereof may be omitted in alternative embodiments. In one embodiment, the mobile device 114 is a battery-powered device and includes a battery 528 and a battery interface 530.

Figure 6:
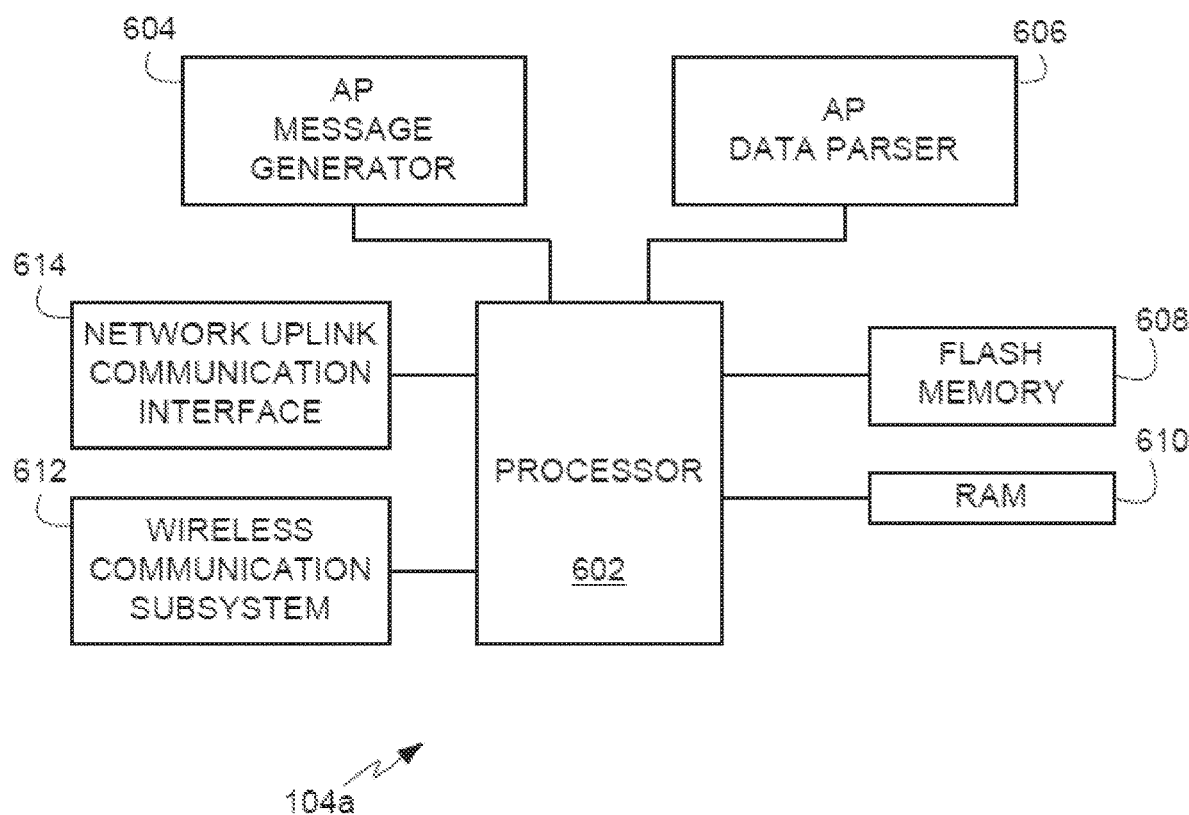
FIG. 6 illustrates an access point ("AP")

FIG. 6 illustrates an AP 104a. The AP shown in FIG. 6 is AP 104a, but may also be illustrative of other APs (e.g. APs 104b, 104c). AP 104a includes a processor 602 to perform operations of the AP 104a. The processor 602 may be similar to the processor 502 described above.

The AP 104a includes an AP message generator 604 to generate network information communications and an AP data parser 606 for retrieving network information communications from the mobile device 114 and/or the external network A 108a as illustrated in FIG. 1. The AP message generator 604 may be similar to the terminal message generator 504 of FIG. 5, and the AP data parser 606 may be similar to the terminal data parser 506 of FIG. 5. As with the terminal message generator 504 and the terminal data parser 506 of FIG. 5, the AP message generator 604 and the AP data parser 606 may be implemented in software stored on a memory that is executable by the processor 602 or may be implemented in hardware with software functions executed by the processor 602. Alternatively, the AP message generator 604 and the AP data parser 606 may be implemented in a wireless communication subsystem (e.g., a wireless communication subsystem 612) using any combination of hardware, firmware, and/or software including instructions stored on a tangible computer readable medium and/or a non-transitory computer readable medium.

The AP 104a may also include a FLASH memory 608 and a RAM 610, both of which are coupled to the processor 602. The FLASH memory 608 and/or the random access memory ("RAM") 610 may be configured to store network information (e.g., network information 120 including discovery communications from FIG. 1). The RAM 610 may also be used to generate messages for communication with the mobile device 114 and/or to the external network A 108a. The RAM 610 may also store received messages communicated by the mobile device 114 and/or the external network A 108a.

To communicate with mobile devices such as the mobile device 114, the AP 104a may include a wireless communication subsystem 612, which may be similar to the wireless communication subsystem 518 of the mobile device 114 illustrated in FIG. 5. To communicate with a WLAN-supported network or external network (e.g., the networks 106a-c, 108a, and 108b of FIG. 1), the AP 104a may include a network uplink communication interface 614.

Figure 7:
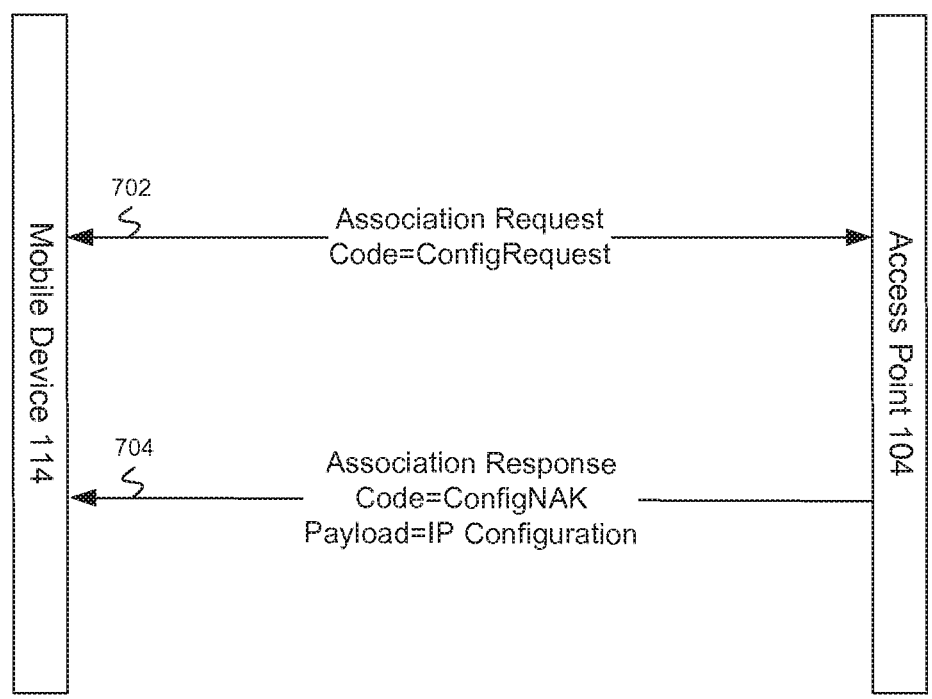
FIG. 7 illustrates association communications.

FIG. 7 illustrates association communications in an exemplary message flow for requesting and receiving an IP address. The IP address may be from the IP address pool 303. An association request 702 may be sent from the mobile device 114 to the AP. The request may include a configuration request. The response message 704 from the AP to the mobile device 114 may include a configuration code "ConfigNAK" and a payload that includes the IP Configuration.

In one embodiment, the communications may be according to the LCP protocol or another similar protocol that is point-to-point. The format for the request/response may take the form of either a vendor specific Internet Protocol Control Protocol ("IPCP") configuration option or a vendor-specific request. The association request 702 may include the following body:

TABLE 1

Association Response frame body

| Order | Information | Notes |
|---|---|---|
| <ANA> | LCP IP Address Assignment Element | The LCP IP Address Assignment element is included when dot11LCPIPAddresssActivated. |

The association request 702 may include the following body:

TABLE 2

Association Response frame body

| Order | Information | Notes |
|---|---|---|
| <ANA> | LCP IP Address Assignment Element | The LCP IP Address Assignment element is included when dot11LCPIPAddresssActivated is true and an LCP IP Address Assignment element was received in the Association Request. |

ANA refers to the IEEE 802.11 Assigned Numbers Authority and may be an integer value assigned when these tables are added to the IEEE 802.11 standard.

An example of an LCP IP Address Assignment element or sub-element may be illustrated in Table 3:

TABLE 3

| | Element ID | Length | Protocol | Identifier | Code | LCP Payload |
|---|---|---|---|---|---|---|
| Octets: | 1 | 1 | 2 | 1 | 1 | 31 or 53 |

Table 3 illustrates one embodiment of an element for address assignment according to LCP or a similar protocol. The data format of the element may be based on vendor-specific commands for the LCP protocol. The Element ID may be defined either by IEEE 802.11 or by IEEE 802.11ai. The length of the element may be fixed, such as at 37 or 59 octets. In alternative embodiments, the length of the LCP Payload may be variable, in which case an additional LCP Payload Length field would also be present. The protocol may be based on LCP and may be expressed as 0xC021. An identifier may uniquely identify the request instance from the mobile device. The code may identify the type of request/response. For example, the codes may include Configure-Request=1; Configure-Ack=2; Configure Nak=3; Configure-Reject=4; Configure-Error=5; and Configure-Unknown=6. Configure-Request may be the request that the client makes to the address assignment server for an IP address. Configure-Ack may be an acknowledgement response from the address assignment server that every value from the client has been accepted. Configure-Nak may be a non-acknowledgement response from the address assignment server that every value from the client has been recognized but not all of them have been accepted. Configure-Reject may be a response from the address assignment server that some values from the client have not been recognized or some of them have not been accepted. Configure-Error may be a response from the address assignment server that an error has occurred. Configure-Unknown may be a response from the address assignment server that an address has not been assigned for an unknown reason.

The format of the LCP Payload field is either 31 or 53 octets in length may be illustrated in Table 4 for an IPv4 address and in Table 5 for an IPv6 address:

TABLE 4

| | Magic Number | OUI | Type | IP Address | Subnet mask | Default gateway | Primary DNS | Secondary DNS |
|---|---|---|---|---|---|---|---|---|
| Octets: | 1 | 3 | 1 | 4 | 4 | 4 | 4 | 4 |

TABLE 5

| | Magic Number | OUI | Type | IP Address | Primary DNS | Secondary DNS |
|---|---|---|---|---|---|---|
| Octets: | 1 | 3 | 1 | 16 | 16 | 16 |

The Magic Number may be set to 0. The OUI is the Organization Unit Identifier that indicates IEEE 802.11 and may be set to 00:0F:AC. The OUI field may be provided to maintain consistency with the existing LCP protocol. The Type field indicates whether the request is for an IPv4, or an IPv6 address, or both. On the request the type field may correspond to the following values: 0=reserved; 1=STA supports IPv4 only; 2=STA supports IPv6 only; and 3=STA supports both IPv4 and IPv6. The Type field in the response is set to either 1 or 2 to indicate the address provided is an IPv4 or IPv6 address, respectively. The IP address field may always be present and indicates the IPv4 or IPv6 IP address when not set to 0. The Subnet mask field may only be present when the Type field equals 1 and is the subnet mask for the IP address as expressed as a bit field. The Default Gateway field may only be present when the Type field equals 1 and indicates the default gateway IP address when not set to 0. The Primary DNS field may always be present and is the IP address of the primary DNS server when not set to 0. The Secondary DNS field may always be present and is the IP address of the secondary DNS server. If there is no secondary DNS, all octets are set to 0.

In one embodiment, digital signatures derived from a security association established prior to association may be used to maintain either confidentiality or message integrity of the LCP IP Address Assignment element. For example, a MIC field defined in a similar manner to the MIC field may be used to confirm authenticity of the LCP IP Address Assignment element during the association.

The procedure for associating a mobile device may include the LCP IP address assignment element in the association request 702 and/or response 704. It may set the code field in the LCP IP address assignment element to 1 to indicate a configure-request. If the associating mobile device has an IP configuration cached for the ESS, it may include the IP configuration in the LCP payload field. It sets the Type value in the LCP payload field to 1 if the configuration is IPv4, or 2 if the IP configuration is IPv6. If it does not have a cached configuration for the network, it sets the Type field in the LCP Payload field to 1 if it supports IPv4 only, 2 if it supports IPv6 only, or 3 if it supports IPv4 or IPv6. It sets the remaining LCP payload fields to its cached IP configuration.

When the associating mobile device receives the association response 704 containing the LCP IP address assignment element, it examines the code field and performs the following: 1) if the code field is set to configuration-Ack, the mobile device sets its IP address configuration that it provided in the associate request 702; 2) if the code field is set to configuration-Nak, the mobile device sets its IP address configuration that was provided in the association response 704; 3) if the code field is set to configuration-Reject, the mobile device uses a higher layer mechanism such as DHCP to obtain an IP address configuration after it completes the association; 4) if the code field is set to configuration-Ack, but the mobile device did not provide an IP address configuration in the association request 702, the mobile device uses a higher layer mechanism such as DHCP to obtain an IP address configuration after it completes the association.

The procedure for an AP that receives an association request 702 that includes the LCP IP address assignment element may generate response 704. If the code field in the Association Request 702 is not set to 1, the AP may respond with the code field set to configure-Reject. The IP address, Subnet MASK, Default Gateway, Primary DNS and Secondary DNS fields are all set to 0. Conversely, if the code field in the Association Request 702 is set to 1 and the mobile device has supplied a valid IP address configuration for the network, the AP will check the validity of the IP address configuration against its configured IP address pool and respond with an LCP IP address assignment element with the code set to configure-Ack. The LCP Payload fields with the exception of the Magic Number and OUI fields may be all set to 0. Finally, if the code field in the Association Request 702 is set to 1 and the mobile device has supplied either an invalid IP address configuration or IP address, Subnet MASK, Default Gateway, Primary DNS, and Secondary DNS fields are set to 0, the AP shall assign the mobile device an IP address configuration from its IP address configuration pool. The AP shall respond with an LCP IP address assignment element with the code set to configure-Nak, and with the LCP Payload fields set to the IP configuration for the mobile device. Any valid IP address configuration may contain non-zero values for the IP address, subnet mask, Default Gateway address, and Primary DNS fields corresponding to the Type field value. If there is no assigned Secondary DNS, the Secondary DNS may be set to 0.

The capability described above assigns the IP address to the mobile device (e.g. a STA) such that the mobile device can maintain the IP address when transitioning between networks (e.g. ESSs). This capability may be advertised with pre-association/discovery communications. In one embodiment, ANQP may be utilized to advertise this capability. The advertisement allows a mobile device to determine if a network (e.g. a currently connected network and/or a network to be transitioned to) has this capability. In particular, the mobile device and/or AP may advertise if it includes this capability. The advertisement may be through a new bit that is defined within the IEEE 802.11 extended capabilities element. Alternatively, a new ANQP-element may be defined advertising this capability. Finally, a new bit may be added to the association request frame indicating this capability. As described, this capability may be referred to as an LCP capability, LCP compatibility or LCP support, but it should be understood that alternative protocols other than LCP may also be utilized.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

What is claimed is:

1. A method performed by a mobile device, comprising:
requesting a connection with a first Extended Service Set (ESS) wireless network;
receiving an internet protocol (IP) address from the first ESS wireless network after requesting the connection with the first ESS wireless network, wherein the IP address is received from a server with IP addresses that are available through both the first ESS wireless network and a second ESS wireless network;
receiving, from the first ESS wireless network using Access Network Query Protocol (ANQP) prior to associating with the first ESS wireless network, an indication of support for transitioning to different ESS wireless networks while maintaining the IP address; and
transitioning from the first ESS wireless network to the second ESS wireless network while maintaining the IP address.

2. The method of claim 1, wherein the indication is carried in an extended capability bit.

3. The method of claim 1, further comprising:
terminating the connection with the first ESS wireless network; and
connecting with the second ESS wireless network using the IP address.

4. The method of claim 1, wherein transitioning from the first ESS wireless network to the second ESS wireless network is expedited when the IP address does not change during transition from the first ESS wireless network to the second ESS wireless network.

5. The method of claim 1, wherein receiving the IP address and transitioning from the first ESS wireless network to the second ESS wireless network are based on Link Control Protocol ("LCP").

6. The method of claim 1, further comprising connecting with the second ESS wireless network while maintaining the IP address.

7. The method of claim 1, further comprising transmitting a message indicating an ability to transition between ESSs prior to associating with the first ESS wireless network.

8. The method of claim 1, further comprising transitioning to the second ESS wireless network from the first ESS wireless network.

9. The method of claim 1, further comprising:
receiving a first request for an address from a first wireless local area network (WLAN); and
assigning the address from a server of available IP addresses to facilitate a connection with the first WLAN, wherein the address is used to transition from the first WLAN to a second WLAN when the first WLAN and the second WLAN both receive IP addresses from the server of available IP addresses.

10. A system for transitioning between Extended Service Set (ESS) wireless networks, wherein the system comprises:

a mobile device configured to:
- transmit a request for a connection with a first ESS wireless network;
- receive an internet protocol (IP) address from the first ESS wireless network subsequent to transmission of the request for the connection with the first ESS wireless network, wherein the IP address is received from a server with IP addresses that are available through both the first ESS wireless network and a second ESS wireless network;
- receive, from the first ESS wireless network using Access Network Query Protocol (ANQP) prior to associating with the first ESS wireless network, an indication of support for transitioning to different ESS wireless networks while maintaining the IP address; and
- transition from the first ESS wireless network to the second ESS wireless network while maintaining the IP address.

11. The system of claim 10, wherein the indication is carried in an extended capability bit.

12. The system of claim 10, wherein the mobile device is further configured to:
- terminate the connection with the first ESS wireless network; and
- connect with the second ESS wireless network using the IP address.

13. The system of claim 10, wherein the mobile device is further configured to receive the IP address and transition from the first ESS wireless network to the second ESS wireless network using Link Control Protocol ("LCP").

14. The system of claim 10, wherein the mobile device is further configured to transmit a message indicating an ability to transition between ESSs prior to associating with the first ESS wireless network.

15. A non-transitory computer-readable medium configured to store a computer program product comprising computer executable instructions that, when executed by a processor of a mobile device, cause the processor to be configured to:
- transmit a request for a connection with a first Extended Service Set (ESS) wireless network;
- receive an internet protocol (IP) address from the first ESS wireless network subsequent to transmission of the request for the connection with the first ESS wireless network, wherein the IP address is received from a server with IP addresses that are available through both the first ESS wireless network and a second ESS wireless network;
- receive, from the first ESS wireless network using Access Network Query Protocol (ANQP) prior to associating with the first ESS wireless network, an indication of support for transitioning to different ESS wireless networks while maintaining the IP address; and
- transition from the first ESS wireless network to the second ESS wireless network while maintaining the IP address.

16. The non-transitory computer-readable medium of claim 15, wherein the indication is carried in an extended capability bit.

17. The non-transitory computer-readable medium of claim 15, wherein the computer executable instructions further cause the processor to be configured to:
- terminate the connection with the first ESS wireless network; and
- connect with the second ESS wireless network using the IP address.

18. The non-transitory computer-readable medium of claim 15, wherein the computer executable instructions further cause the processor to be configured to receive the IP address and transition from the first ESS wireless network to the second ESS wireless network using Link Control Protocol ("LCP").

19. The non-transitory computer-readable medium of claim 15, wherein the computer executable instructions further cause the processor to be configured to connect with the second ESS wireless network while maintaining the IP address.

20. The non-transitory computer-readable medium of claim 15, wherein the computer executable instructions further cause the processor to be configured to transmit a message indicating an ability to transition between ESSs prior to associating with the first ESS wireless network.

* * * * *